United States Patent
Jiang et al.

(10) Patent No.: US 12,238,128 B2
(45) Date of Patent: Feb. 25, 2025

(54) DATA PROCESSING METHOD AND APPARATUS

(71) Applicant: Huawei Technologies Co., Ltd., Shenzhen (CN)

(72) Inventors: Weiyu Jiang, Beijing (CN); Bingyang Liu, Beijing (CN); Chuang Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/675,275

(22) Filed: Feb. 18, 2022

(65) Prior Publication Data

US 2022/0174085 A1 Jun. 2, 2022

Related U.S. Application Data

(63) Continuation of application No. PCT/CN2020/110049, filed on Aug. 19, 2020.

(30) Foreign Application Priority Data

Aug. 19, 2019 (CN) .......................... 201910766203.4

(51) Int. Cl.
*H04L 9/40* (2022.01)
(52) U.S. Cl.
CPC ...... *H04L 63/1425* (2013.01); *H04L 63/0435* (2013.01); *H04L 63/1416* (2013.01); *H04L 63/1458* (2013.01); *H04L 63/166* (2013.01); *H04L 63/20* (2013.01)

(58) Field of Classification Search
CPC ............. H04L 63/1425; H04L 63/0435; H04L 63/1416; H04L 63/1458; H04L 63/166; H04L 63/20
See application file for complete search history.

(56) References Cited

U.S. PATENT DOCUMENTS

| | | | | |
|---|---|---|---|---|
| 5,600,722 | A | * 2/1997 | Yamaguchi | ........... H04L 9/0838 713/162 |
| 11,449,626 | B2 | * 9/2022 | Ramaraj | .......... H04N 21/23476 |
| 2005/0050364 | A1 | 3/2005 | Feng | |
| 2006/0168649 | A1 | 7/2006 | Venkat et al. | |

(Continued)

FOREIGN PATENT DOCUMENTS

| | | | | |
|---|---|---|---|---|
| CN | 106534070 A | * 3/2017 | ............. H04L 63/06 |
| CN | 109076399 A | 12/2018 | | |

OTHER PUBLICATIONS

Goodin, Dan, "US service provider survives the biggest recorded DDOS in history," Ars Technica, Mar. 6, 2018, 11 pages.

(Continued)

*Primary Examiner* — Yonas A Bayou
(74) *Attorney, Agent, or Firm* — Conley Rose, P.C.

(57) ABSTRACT

A data processing method includes an authenticated identifier and a key corresponding to the authenticated identifier are allocated to a terminal that accesses a service supported by an application server. The terminal includes the authenticated identifier and a verification code in a sent data packet such that a network device can identify a legal data packet and an illegal data packet based on the authenticated identifier and the verification code, and forward the legal data packet.

20 Claims, 13 Drawing Sheets

(56) References Cited

U.S. PATENT DOCUMENTS

| | | | |
|---|---|---|---|
| 2008/0052509 A1* | 2/2008 | Ahmed | H04L 63/02 |
| | | | 713/156 |
| 2014/0164776 A1* | 6/2014 | Hook | G06F 21/6218 |
| | | | 713/171 |
| 2017/0063797 A1* | 3/2017 | Jain | H04L 63/20 |
| 2017/0171170 A1* | 6/2017 | Sun | H04L 9/088 |
| 2017/0237767 A1 | 8/2017 | George et al. | |
| 2017/0324652 A1 | 11/2017 | Lee et al. | |
| 2018/0026994 A1* | 1/2018 | Han | H04L 63/145 |
| | | | 726/23 |
| 2018/0198761 A1* | 7/2018 | Naylor | H04L 63/0435 |
| 2019/0014145 A1* | 1/2019 | Levine | H04L 63/0869 |

OTHER PUBLICATIONS

Antonakakis, Manos, et al., "Understanding the Mirai Botnet," 26th {USENIX} Security Symposium ({USENIX} Security 17), 2017, 2 pages.

* cited by examiner

DATA PROCESSING METHOD AND APPARATUS

CROSS-REFERENCE TO RELATED APPLICATIONS

This is a U.S. Continuation of International Patent Application No. PCT/CN2020/110049 filed on Aug. 19, 2020, which claims priority to Chinese Patent Application No. 201910766203.4 filed on Aug. 19, 2019. The disclosures of the aforementioned applications are hereby incorporated by reference in their entireties.

TECHNICAL FIELD

This application relates to the communication field, and in particular, to a data processing method and an apparatus.

BACKGROUND

A distributed denial-of-service (DDoS) attack is still a major factor that destroys network availability and threatens network security. A black hole technology or a traffic cleaning technology is usually used to defend against the DDoS attack in a conventional technology. However, a network device directs both illegal traffic and legal traffic to a black hole by using the black hole technology, and the legal traffic and the illegal traffic cannot be distinguished. Although the network device can distinguish between the legal traffic and the illegal traffic by using the traffic cleaning technology, this causes a long delay of distinguishing between the legal traffic and the illegal traffic. Therefore, how to quickly distinguish between the legal traffic and the illegal traffic during DDoS attack defense is an urgent problem to be resolved.

SUMMARY

This application provides a data processing method and an apparatus, to resolve a problem of how to quickly distinguish between legal traffic and illegal traffic during DDoS attack defense.

To achieve the foregoing objective, the following technical solutions are used in this application.

According to a first aspect, this application provides a data processing method. The method may be applied to a terminal, or the method may be applied to a communication apparatus that can support the terminal in implementing the method. For example, the communication apparatus includes a chip system. The method includes receiving a first authenticated identifier and a first key, generating a first verification code based on the first authenticated identifier and the first key, and including the first authenticated identifier and the first verification code in a first data packet when sending the first data packet.

In the data processing method provided in this embodiment of this application, an authenticated identifier and a key corresponding to the authenticated identifier are allocated to a terminal that accesses a service supported by a target device. The terminal includes the authenticated identifier and a verification code in a sent data packet, so that a network device can identify a legal data packet and an illegal data packet based on the authenticated identifier and the verification code. Only the legal data packet can be forwarded. Compared with a black hole technology, the data processing method provided in this embodiment of this application can ensure that legal traffic (which is traffic sent by a registered terminal) is forwarded, and the network device filters out most of DDoS attack traffic. Compared with a traffic cleaning technology, the data processing method provided in this embodiment of this application can reduce a delay of processing the legal traffic caused by deep protocol parsing.

In a possible implementation, the generating a first verification code based on the first authenticated identifier and the first key includes generating the first verification code based on the first authenticated identifier, the first key, and at least one of a first locator, a second locator, and a dynamic parameter. The first locator is used to indicate the target device, the second locator is used to indicate a first terminal, and the dynamic parameter varies with time. In this way, complexity of the first verification code is increased. This improves a security level of the first verification code, and avoids leakage of the first verification code.

In some embodiments, a static identifier of the target device may be obtained. The static identifier of the target device includes the first locator, to help the first terminal generate the first verification code.

In another possible implementation, the first authenticated identifier and the first verification code are set in a network layer protocol header or a transport layer protocol header included in the first data packet.

In some embodiments, the first authenticated identifier and the first verification code are set in an Internet Protocol (IP) address field in the network layer protocol header included in the first data packet. For example, the first authenticated identifier and the first verification code are set in a destination IP address field in the network layer protocol header included in the first data packet. For another example, the first authenticated identifier and the first verification code are set in a source IP address field in the network layer protocol header included in the first data packet. In this case, the first authenticated identifier may be embedded in an IP address, so that the network device may directly perform filtering at a network layer. This reduces costs of defending against a DDoS attack, and does not rely on cross-domain collaboration.

It should be noted that a destination IP address may be a destination IP address in an IP version 6 (IPv6) data packet. A source IP address may be a source IP address in the IPv6 data packet. The destination IP address may be a destination IP address in an IP version 4 (IPv4) data packet. The source IP address may be a source IP address in the IPv4 data packet.

In other embodiments, the first authenticated identifier and the first verification code are set in a next header field in the network layer protocol header included in the first data packet. In this case, the first authenticated identifier may be embedded in the next header field, so that the network device may directly perform filtering at the network layer. This reduces costs of defending against a DDoS attack, and does not rely on cross-domain collaboration.

In other embodiments, the first authenticated identifier and the first verification code are set in an option field in the network layer protocol header included in the first data packet.

In other embodiments, the first authenticated identifier and the first verification code are set in an option field in a Transmission Control Protocol (TCP) header included in the first data packet. In this case, the first authenticated identifier may be embedded in the TCP header, so that the network device may directly perform filtering at a transport layer. This reduces costs of defending against a DDoS attack, and does not rely on cross-domain collaboration.

According to a second aspect, this application provides a data processing method. The method may be applied to a network device, or the method may be applied to a communication apparatus that can support the network device in implementing the method. For example, the communication apparatus includes a chip system. The method includes, after receiving a first data packet, obtaining a first authenticated identifier and a first verification code that are included in the first data packet, and a first key corresponding to the first authenticated identifier, generating a second verification code based on the first authenticated identifier and the first key, determining whether the second verification code is the same as the first verification code, and determining that the first data packet is legal when the second verification code is the same as the first verification code, or determining that the first data packet is illegal when the second verification code is different from the first verification code.

In the data processing method provided in this embodiment of this application, an authenticated identifier and a key corresponding to the authenticated identifier are allocated to a terminal that accesses a service supported by a target device. The terminal includes the authenticated identifier and a verification code in a sent data packet, so that a network device can identify a legal data packet and an illegal data packet based on the authenticated identifier and the verification code. Only the legal data packet can be forwarded. Compared with a black hole technology, the data processing method provided in this embodiment of this application can ensure that legal traffic (which is traffic sent by a registered terminal) is forwarded, and the network device filters out most of DDoS attack traffic. Compared with a traffic cleaning technology, the data processing method provided in this embodiment of this application can reduce a delay of processing the legal traffic caused by deep protocol parsing.

In a possible implementation, the method further includes forwarding the first data packet to a target device if it is determined that the first data packet is legal. In this way, the legal data packet reaches the target device.

In another possible implementation, obtaining a first key corresponding to the first authenticated identifier includes generating the first key based on the first authenticated identifier and a second key. The second key is a key corresponding to a first service, and the second key is used to derive a key of a registered terminal that can access the first service.

Further, the second key may be obtained in the following manners.

In some embodiments, the second key is obtained based on a first locator. The first data packet further includes the first locator. The first locator is used to indicate the target device.

In other embodiments, a third key is obtained based on a first locator. The second key is generated based on the third key and a first service identifier, or the second key is generated based on the third key and the first locator. The third key is used to derive a root key corresponding to a service. The first data packet further includes the first locator and the first service identifier. The first locator is used to indicate the target device. The first service identifier is used to indicate the first service running on the target device. Because all services share a same root key, a mapping table that needs to be maintained by the network device is small, and there is no need to maintain a correspondence entry for each service. In addition, this reduces query overheads of the network device.

In another possible implementation, generating a second verification code based on the first authenticated identifier and the first key includes generating the second verification code based on the first authenticated identifier, the first key, and at least one of the first locator, a second locator, and a dynamic parameter. The first data packet further includes the first locator and the second locator. The first locator is used to indicate the target device, the second locator is used to indicate a first terminal, and the dynamic parameter varies with time. In this way, complexity of the first verification code is increased. This improves a security level of the first verification code, and avoids leakage of the first verification code.

In another possible implementation, before receiving a first data packet, the method further includes receiving a filtering request. The filtering request includes the first locator, the first service identifier, and the second key. In this case, the network device may verify the received data packet, and filter out an illegal data packet, to defend against a DDoS attack.

In another possible implementation, the method further includes determining that a volume of traffic corresponding to the first authenticated identifier is greater than or equal to a threshold, and limiting the traffic corresponding to the first authenticated identifier. Therefore, a large number of data packets are prevented from being sent to the target device to defend against the DDoS attack.

According to a third aspect, this application provides a key distribution method. The method may be applied to a target device, or the method may be applied to a communication apparatus that can support the target device in implementing the method. For example, the communication apparatus includes a chip system. The method includes obtaining a first authenticated identifier and a second key, generating a first key based on the first authenticated identifier and the second key, and sending the first authenticated identifier and the first key to a first terminal.

In the key distribution method provided in this embodiment of this application, an authenticated identifier and a key corresponding to the authenticated identifier are allocated to a terminal that accesses a service supported by a target device. The terminal includes the authenticated identifier and a verification code in a sent data packet, so that a network device can identify a legal data packet and an illegal data packet based on the authenticated identifier and the verification code. Only the legal data packet can be forwarded. Compared with a black hole technology, the key distribution method provided in this embodiment of this application can ensure that legal traffic (which is traffic sent by a registered terminal) is forwarded, and the network device filters out most of DDoS attack traffic. Compared with a traffic cleaning technology, the key distribution method provided in this embodiment of this application can reduce a delay of processing the legal traffic caused by deep protocol parsing.

In a possible implementation, obtaining a first authenticated identifier includes obtaining a first service identifier, and generating the first authenticated identifier based on the first service identifier and a first terminal identifier. The first service identifier is used to indicate a first service running on the target device. The first terminal identifier is used to indicate the first terminal.

In another possible implementation, obtaining a first authenticated identifier includes generating the first authenticated identifier based on a first terminal identifier. The first terminal identifier is used to indicate the first terminal.

In another possible implementation, before obtaining a first authenticated identifier and a second key, the method further includes, after receiving a registration request sent by the first terminal, allocating the first terminal identifier to the first terminal.

According to a fourth aspect, this application further provides a communication apparatus, configured to implement the method described in the first aspect. The communication apparatus is a terminal or a communication apparatus that supports the terminal in implementing the method described in the first aspect. For example, the communication apparatus includes a chip system. For example, the communication apparatus includes a receiving unit, a processing unit, and a sending unit. The receiving unit is configured to receive a first authenticated identifier and a first key. The processing unit is configured to generate a first verification code based on the first authenticated identifier and the first key. The sending unit is configured to send a first data packet, where the first data packet includes the first authenticated identifier and the first verification code.

Optionally, for a method for generating the first verification code based on the first authenticated identifier and the first key, refer to the corresponding description in the first aspect. Details are not described herein again.

According to a fifth aspect, this application further provides a communication apparatus, configured to implement the method described in the second aspect. The communication apparatus is a network device or a communication apparatus that supports the network device in implementing the method described in the second aspect. For example, the communication apparatus includes a chip system. For example, the communication apparatus includes a receiving unit and a processing unit. The receiving unit is configured to receive a first data packet, where the first data packet includes a first authenticated identifier and a first verification code. The processing unit is configured to obtain a first key corresponding to the first authenticated identifier. The processing unit is further configured to generate a second verification code based on the first authenticated identifier and the first key. The processing unit is further configured to determine that the first data packet is legal when the second verification code is the same as the first verification code. The processing unit is further configured to determine that the first data packet is illegal when the second verification code is different from the first verification code.

Optionally, the communication apparatus may further include a sending unit. The sending unit is configured to forward the first data packet to a target device if the network device determines that the first data packet is legal.

Optionally, for a method for generating the second verification code, refer to the corresponding description in the second aspect. Details are not described herein again.

According to a sixth aspect, this application further provides a communication apparatus, configured to implement the method described in the third aspect. The communication apparatus is a target device or a communication apparatus that supports the target device in implementing the method described in the third aspect. For example, the communication apparatus includes a chip system. For example, the communication apparatus includes a processing unit and a sending unit. The processing unit is configured to obtain a first authenticated identifier and a second key. The processing unit is further configured to generate a first key based on the first authenticated identifier and the second key. The sending unit is configured to send the first authenticated identifier and the first key to a first terminal.

Optionally, the communication apparatus may further include a receiving unit, configured to obtain a first service identifier and a registration request. The first service identifier is used to indicate a first service running on the target device. The processing unit is configured to allocate a first terminal identifier to the first terminal. The first terminal identifier is used to indicate the first terminal. In this case, the processing unit generates the first authenticated identifier based on the first service identifier and the first terminal identifier. Alternatively, the processing unit generates the first authenticated identifier based on the first terminal identifier.

It should be noted that functional modules in the fourth aspect to the sixth aspect may be implemented by using hardware, or may be implemented by using hardware executing corresponding software. The hardware or software includes one or more modules corresponding to the foregoing functions. For example, a transceiver is configured to complete functions of the receiving unit and the sending unit, a processor is configured to complete a function of the processing unit, and a memory is configured to store program instructions used by the processor to perform the methods in this application. The processor, the transceiver, and the memory are connected through a bus and implement mutual communication. Further, refer to functions of behavior of the terminal, the network device, and the target device in the method according to the first aspect to the third aspect.

According to a seventh aspect, this application further provides a communication apparatus, configured to implement the method described in the first aspect. The communication apparatus is a terminal or a communication apparatus that supports the terminal in implementing the method described in the first aspect. For example, the communication apparatus includes a chip system. For example, the communication apparatus includes a processor, configured to implement the functions of the method described in the first aspect. The communication apparatus may further include a memory, configured to store program instructions and data. The memory is coupled to the processor, and the processor may invoke and execute the program instructions stored in the memory, to implement the functions in the method described in the first aspect. The communication apparatus may further include a communication interface, and the communication interface is used by the communication apparatus to communicate with another device. For example, if the communication apparatus is a terminal, the other device is a network device.

In a possible device, the communication apparatus includes a transceiver and the processor. The transceiver is configured to receive a first authenticated identifier and a first key. The processor is configured to generate a first verification code based on the first authenticated identifier and the first key. The transceiver is further configured to send a first data packet, where the first data packet includes the first authenticated identifier and the first verification code.

Optionally, for a method for generating the first verification code based on the first authenticated identifier and the first key, refer to the corresponding description in the first aspect. Details are not described herein again.

According to an eighth aspect, this application further provides a communication apparatus, configured to implement the method described in the second aspect. The communication apparatus is a network device or a communication apparatus that supports the network device in implementing the method described in the second aspect.

For example, the communication apparatus includes a chip system. For example, the communication apparatus includes a processor, configured to implement the functions of the method described in the second aspect. The communication apparatus may further include a memory, configured to store program instructions and data. The memory is coupled to the processor, and the processor may invoke and execute the program instructions stored in the memory, to implement the functions in the method described in the second aspect. The communication apparatus may further include a communication interface, and the communication interface is used by the communication apparatus to communicate with another device. For example, if the communication apparatus is a network device, the other device is a terminal.

In a possible device, the communication apparatus includes a transceiver and the processor. The transceiver is configured to receive a first data packet, where the first data packet includes a first authenticated identifier and a first verification code. The processor is configured to obtain a first key corresponding to the first authenticated identifier. The processor is further configured to generate a second verification code based on the first authenticated identifier and the first key. The processor is further configured to determine that the first data packet is legal when the second verification code is the same as the first verification code. The processor is further configured to determine that the first data packet is illegal when the second verification code is different from the first verification code.

Optionally, the transceiver is further configured to forward the first data packet to a target device if the network device determines that the first data packet is legal.

Optionally, for a method for generating the second verification code, refer to the corresponding description in the second aspect. Details are not described herein again.

According to a ninth aspect, this application further provides a communication apparatus, configured to implement the method described in the third aspect. The communication apparatus is a target device or a communication apparatus that supports the target device in implementing the method described in the third aspect. For example, the communication apparatus includes a chip system. For example, the communication apparatus includes a processor, configured to implement the functions of the method described in the third aspect. The communication apparatus may further include a memory, configured to store program instructions and data. The memory is coupled to the processor, and the processor may invoke and execute the program instructions stored in the memory, to implement the functions in the method described in the third aspect. The communication apparatus may further include a communication interface, and the communication interface is used by the communication apparatus to communicate with another device. For example, if the communication apparatus is the target device, the other device is a terminal.

In a possible device, the communication apparatus includes a transceiver and the processor. The processor is configured to obtain a first authenticated identifier and a second key. The processor is further configured to generate a first key based on the first authenticated identifier and the second key. The transceiver is configured to send the first authenticated identifier and the first key to a first terminal.

Optionally, the transceiver is further configured to obtain a first service identifier and a registration request. The first service identifier is used to indicate a first service running on the target device. The processor is configured to allocate a first terminal identifier to the first terminal. The first terminal identifier is used to indicate the first terminal. In this case, the processor generates the first authenticated identifier based on the first service identifier and the first terminal identifier. Alternatively, the processor generates the first authenticated identifier based on the first terminal identifier. For a specific method, refer to the corresponding description in the third aspect. Details are not described herein again.

According to a tenth aspect, this application further provides a computer-readable storage medium, including computer software instructions. When the computer software instructions are run on a communication apparatus, the communication apparatus is enabled to perform the method according to any one of the first aspect to the third aspect.

According to an eleventh aspect, this application further provides a computer program product including instructions. When the computer program product runs on a communication apparatus, the communication apparatus is enabled to perform the method according to any one of the first aspect to the third aspect.

According to a twelfth aspect, this application provides a chip system. The chip system includes a processor, and may further include a memory. The chip system is configured to implement functions of the network device, the terminal, or the target device in the foregoing method. The chip system may include a chip, or may include a chip and another discrete component.

According to a thirteenth aspect, this application further provides a communication system. The communication system includes the terminal described in the fourth aspect or the communication apparatus that is described in the fourth aspect and that supports the terminal in implementing the method described in the first aspect, the network device described in the fifth aspect or the communication apparatus that is described in the fifth aspect and that supports the network device in implementing the method described in the second aspect, and the target device described in the sixth aspect or the communication apparatus that is described in the sixth aspect and that supports the target device in implementing the method described in the third aspect.

The communication system includes the terminal described in the seventh aspect or the communication apparatus that is described in the seventh aspect and that supports the terminal in implementing the method described in the first aspect, the network device described in the eighth aspect or the communication apparatus that is described in the eighth aspect and that supports the network device in implementing the method described in the second aspect, and the target device described in the ninth aspect or the communication apparatus that is described in the ninth aspect and that supports the target device in implementing the method described in the third aspect.

In addition, for technical effects brought by the design manners of any one of the foregoing aspects, refer to technical effects brought by different design manners of the first aspect to the third aspect. Details are not described herein.

In this application, names of the terminal, the network device, the target device, and the communication apparatus constitute no limitation on the devices. During actual implementation, these devices may have other names. Provided that functions of the devices are similar to those of this application, the devices fall within the scope of the claims of this application and equivalent technologies thereof.

DESCRIPTION OF EMBODIMENTS

In this specification, claims, and accompanying drawings of this application, the terms "first", "second", "third", and the like are intended to distinguish between different objects but do not limit a particular order.

In embodiments of this application, the word "example" or "for example" is used to represent giving an example, an illustration, or a description. Any embodiment or design scheme described as an "example" or "for example" in the embodiments of this application shall not be explained as being more preferred or having more advantages than another embodiment or design scheme. Further, use of the word such as "example" or "for example" is intended to present a related concept in a specific manner.

For clear and concise description of the following embodiments, brief descriptions of related technologies are first provided.

Figure 1A:
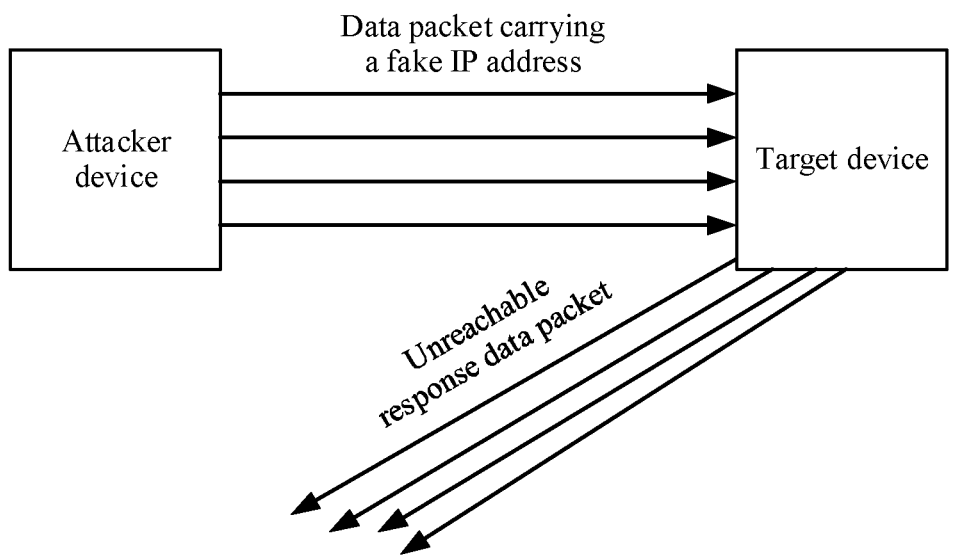
FIG. 1A and FIG. 1B are example diagrams of a DDoS attack according to a conventional technology.
Figure 1B:
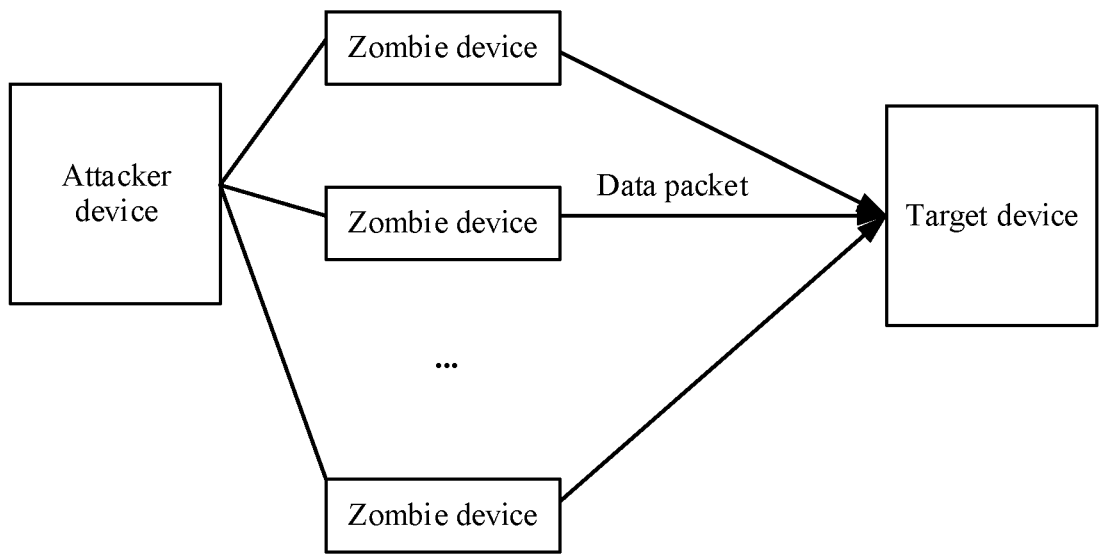

In a DDoS attack, a plurality of attacker devices in different locations simultaneously attack one or more target devices, or an attacker device controls a plurality of devices in different locations and uses these devices to simultaneously attack the target devices. For example, an attacker device sends a large number of data packets carrying fake IP addresses to a target device as shown in FIG. 1A. In this case, the target device maintains a large number of half-open connections or responds to the large number of unreachable data packets. Consequently, resources of the target device are exhausted. For another example, as shown in FIG. 1B, the attacker device controls a large number of zombie devices to send a large number of data packets to the target device in a centralized manner. Consequently, resources of the target device are exhausted.

This application provides a data processing method. The method includes A first terminal receives a first authenticated identifier and a first key that are sent by a target device, generates a first verification code based on the first authenticated identifier and the first key, and includes the first authenticated identifier and the first verification code in a first data packet when the first terminal sends the first data packet to the target device. The first key is derived from a second key, and the second key is a key corresponding to a first service supported by the target device. After receiving the first data packet sent by the first terminal, a network device obtains the first key corresponding to the first authenticated identifier, generates a second verification code based on the first authenticated identifier and the first key, determines that the first data packet is legal when the second verification code is the same as the first verification code, and forwards the first data packet to the target device.

In the data processing method provided in this embodiment of this application, an authenticated identifier and a key corresponding to the authenticated identifier are allocated to a terminal that accesses a service supported by a target device. The terminal includes the authenticated identifier and a verification code in a sent data packet, so that a network device can identify a legal data packet and an illegal data packet based on the authenticated identifier and the verification code. Only the legal data packet can be forwarded. Compared with a black hole technology, the data processing method provided in this embodiment of this application can ensure that legal traffic (which is traffic sent by a registered terminal) is forwarded, and the network device filters out most of DDoS attack traffic. Compared with a traffic cleaning technology, the data processing method provided in this embodiment of this application can reduce a delay of processing the legal traffic caused by deep protocol parsing. In addition, the authenticated identifier may be embedded in an IP address of the target device, so that the network device may directly perform filtering at a network layer. This reduces costs of defending against a DDoS attack, and does not rely on cross-domain collaboration.

It should be noted that the target device may be understood as a protected device or a device that an attacker needs to attack. The target device in the embodiments of this application may be an application server, a router, a device in the Internet of things (IoT), or the like. This is not limited in this application. For example, the IoT device may be a fire alarm device or the like. If the fire alarm device is attacked, the fire alarm device cannot detect fire to give an alarm. In this case, the fire alarm device cannot send an alarm message to the outside, bringing a serious security threat. An example in which the target device is an application server is used for the following description.

The following describes implementations of the embodiments of this application in detail with reference to the accompanying drawings.

Figure 2:
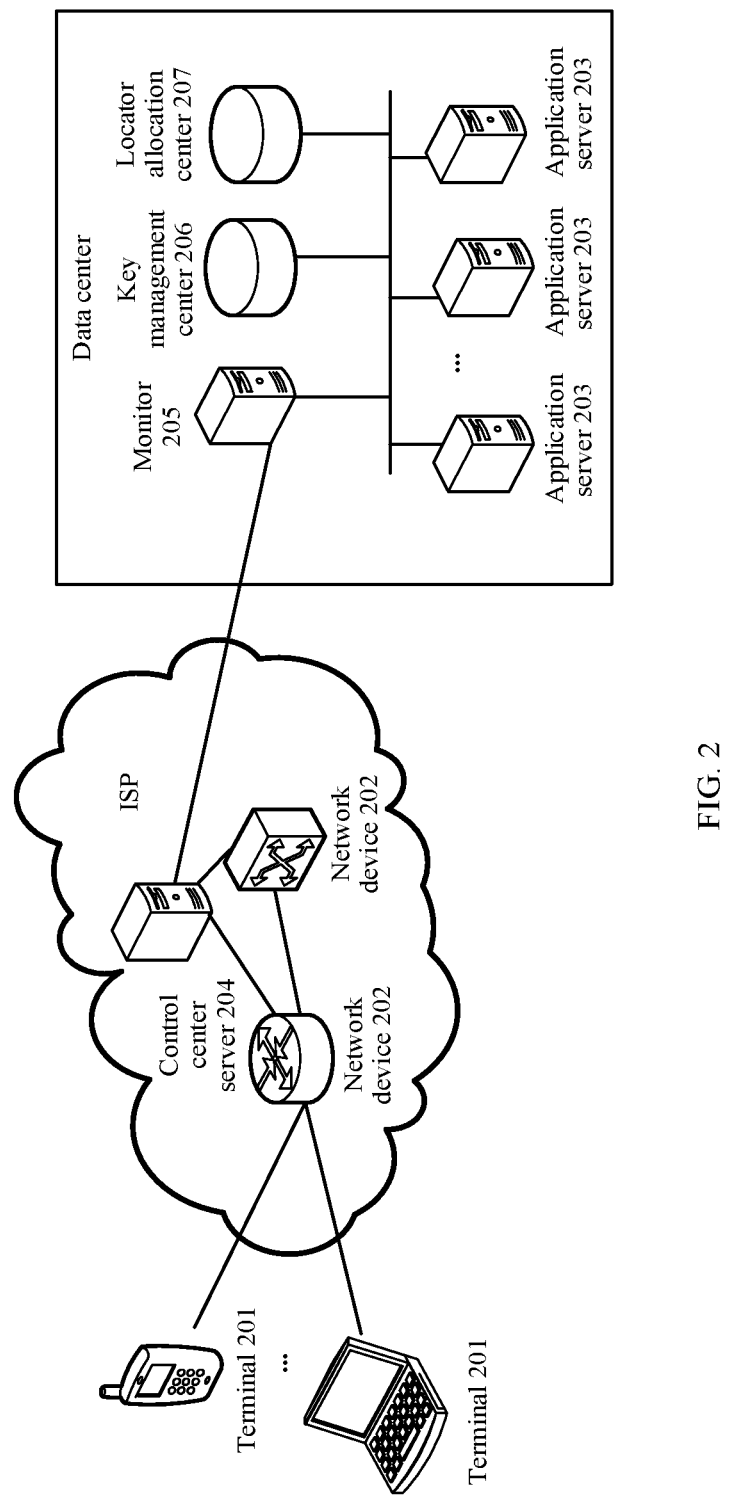
FIG. 2 is an example diagram of an architecture of a communication system according to this application.

FIG. 2 is an example diagram of an architecture of a communication system that may be applied to an embodiment of this application. As shown in FIG. 2, the communication system includes at least one terminal 201, an Internet service provider (ISP) network, and a data center. An ISP may be a telecom operator that provides an internet access service, an information service, and a value-added service to a large number of users. The ISP network may include a network device 202 (for example, a border router and a switch), and the like. The data center may include at least one application server 203. A plurality of application servers may be independent and different physical devices. Alternatively, functions of the plurality of application servers may be integrated on one same physical device (for example, a plurality of application servers in a management scope of a cloud service provider). Alternatively, functions of some of the application servers may be integrated on one physical device. One or more services (for example, a game service) can run on each application server. A service may also be referred to as an application. Each service may be deployed on and run by the plurality of application servers. The terminal 201 is connected to the network device 202 in a wireless or wired manner. Network devices 202 are connected in a wireless or wired manner. The network device 202 is connected to the application server 203 in a wireless or wired manner. The terminal device may be at a fixed location or may be movable. FIG. 2 is merely a schematic diagram, and the communication system may further include other devices, for example, a wireless relay device and a wireless backhaul device not shown in FIG. 2. A quantity of terminals, network devices, and application servers included in the communication system is not limited in this embodiment of this application.

The terminal 201 may be a wireless terminal device that can receive scheduling and indication information from a base station. The wireless terminal device may be a device that provides a user with voice and/or data connectivity, a handheld device having a radio connection function, or another processing device connected to a radio modem. The wireless terminal device may communicate with one or more core networks or the internet through a radio access network (RAN). The wireless terminal device may be a mobile terminal device, for example a mobile phone (or a cellular phone or a mobile phone), a computer, and a data card. For example, the wireless terminal device may be a portable, pocket-sized, handheld, computer built-in, or in-vehicle mobile apparatus that exchanges language and/or data with the radio access network. For example, the device may include a personal communications service (PCS) phone, a cordless phone, a Session Initiation Protocol (SIP) phone, a wireless local loop (WLL) station, a personal digital assistant (PDA), a tablet computer (such as an IPAD), and a computer having wireless receiving and sending functions. The wireless terminal device may also be referred to as a system, a subscriber unit, subscriber station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, a user equipment (UE), a mobile terminal (MT), or the like. In an ultra-reliable low latency communications (URLLC) application scenario, the terminal device may be a wireless terminal in industrial control, a wireless terminal in self driving, a wireless terminal in remote surgery, a wireless terminal in smart grid, a wireless terminal in transportation safety, a wireless terminal in smart city, a wireless terminal in smart home, or the like.

The application server 203 is configured to obtain an authenticated identifier (AID) and a key corresponding to a service, generate a key corresponding to the authenticated identifier based on the authenticated identifier and the key corresponding to the service, and send the authenticated identifier and the key corresponding to the authenticated identifier to the terminal 201. The authenticated identifier is used to identify a terminal that accesses the service. The authenticated identifier may also be understood to be used to identify a terminal of a type that accesses the service.

The terminal 201 is configured to receive the authenticated identifier and the key corresponding to the authenticated identifier that are sent by the application server 203, generate a verification code based on the authenticated identifier and the key corresponding to the authenticated identifier, and include the authenticated identifier and the verification code in a data packet sent by the terminal 201.

The network device 202 is configured to receive the data packet sent by the terminal 201, obtain the key corresponding to the authenticated identifier, determine, based on the verification code, the authenticated identifier, and the key corresponding to the authenticated identifier, that the data packet is legal, and forward the data packet to the application server.

In some embodiments, the ISP network may further include a control center server 204, and the network device 202 is connected to the control center server 204 in a wireless or wired manner. The control center server 204 is configured to receive a filtering request sent by the application server 203. The filtering request may include a locator of the application server 203, a service identifier supported by the application server 203, and a key corresponding to the service. The control center server 204 delivers the filtering request, the authenticated identifier, and the related key to the network device 202, so that the network device 202 implements filtering based on the authenticated identifier and the verification code.

The data center may further include a monitor 205, a key management center 206, and a locator allocation center 207. The monitor 205 is configured to monitor whether the application server in the data center is under a DDoS attack. In some embodiments, the monitor 205 may send a filtering request to the network device 202 when the application server is under the DDoS attack. The locator allocation center 207 is configured to allocate a locator to the application server. The locator is used to indicate the application server. In some embodiments, the locator may be a location identifier of the application server. In other embodiments, the locator may be a routing identifier of the application server. The key management center 206 is configured to allocate a service identifier and a key corresponding to the service identifier to the application server.

In some embodiments, the key management center in the data center may maintain a service-key correspondence for each service supported by the application server. The service-key correspondence may be a correspondence between a service identifier (SID) and a master key (MK) corresponding to the service identifier. The service-key correspondence may be presented in a form of a table. The key management center may store a service-key relationship table, and the service-key relationship table includes at least one service-key correspondence. For example, a service-key relationship is presented as shown in Table 1.

TABLE 1

| Service-key relationship | | |
| --- | --- | --- |
| Service Name | Service identifier | Master key |
| Service 1 | SID 1 | MK 1 |
| Service 2 | SID 2 | MK 2 |
| Service 3 | SID 3 | MK 3 |

It should be noted that Table 1 merely shows, in a form of a table, a storage form of the service-key relationship in the key management center, but does not limit the storage form of the service-key relationship in the key management center. Certainly, the storage form of the service-key relationship in the key management center may alternatively be in another form. This is not limited in this embodiment of this application.

Figure 3:
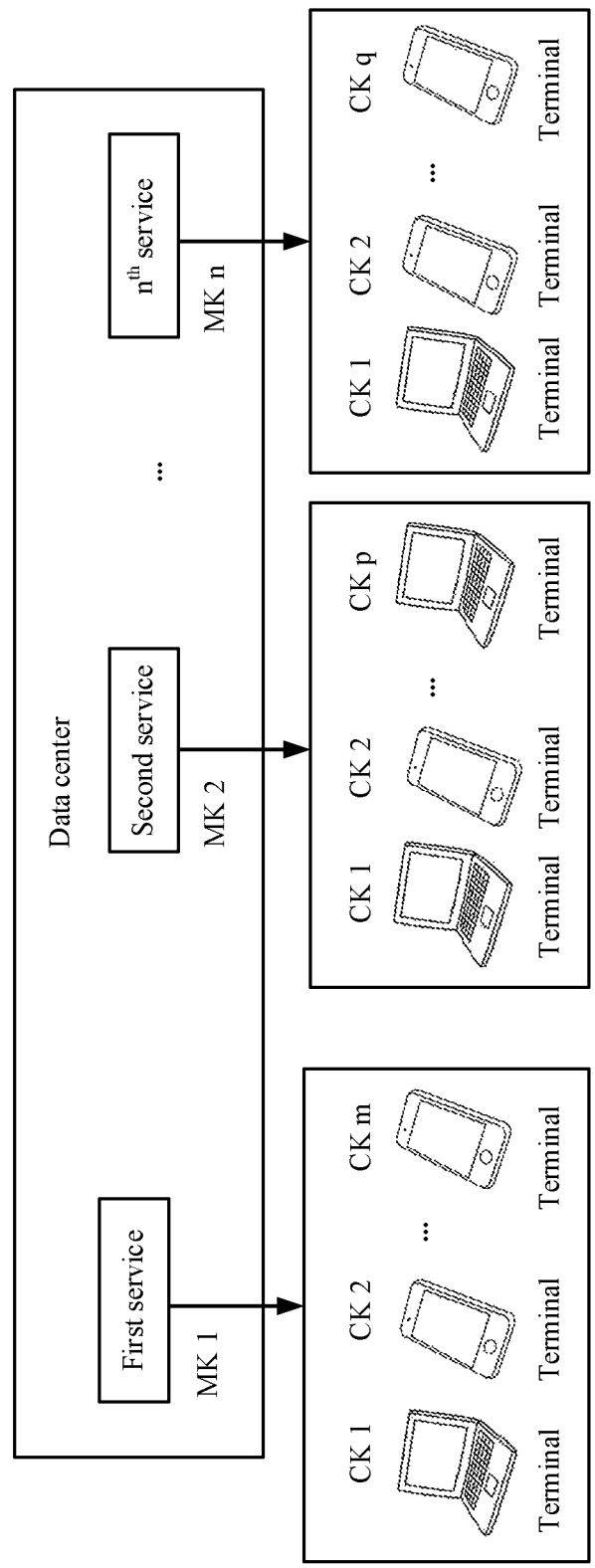
FIG. 3 is an example diagram of key derivation according to this application.

The application server 203 may invoke a first unified software development kit (SDK) interface to obtain the service identifier and the master key corresponding to the service identifier from the key management center. The application server may invoke a second unified SDK interface based on the service identifier and the master key corresponding to the service identifier to generate an authenticated identifier and a terminal key (or a client key (CK)) of a corresponding terminal in the service for a registered terminal. The terminal key may be a key corresponding to the authenticated identifier. The master key is used to derive a key of the registered terminal that can access the service. For example, the application server in the data center supports running n services as shown in FIG. 3. A master key corresponding to a first service is an MK 1. The application server 203 may derive, based on the MK 1, m keys of m registered terminals that can access the first service. A master key corresponding to a second service is an MK 2. The application server 203 may derive, based on the MK 2, p keys of p registered terminals that can access the second service. A master key corresponding to a third service is an MK 3. The application server 203 may derive, based on the MK 3, q keys of q registered terminals that can access the third service.

Figure 4A:
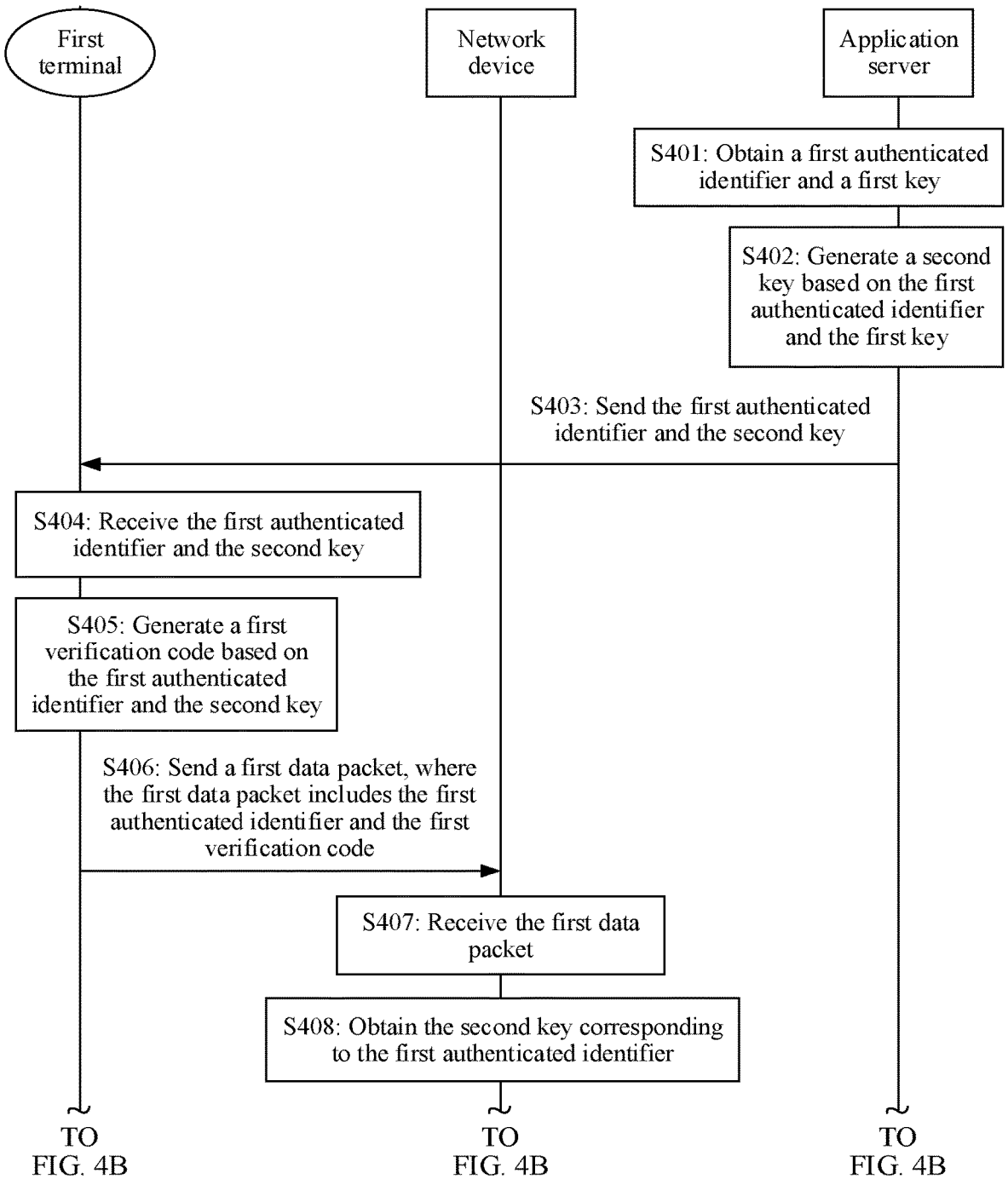
FIG. 4A and FIG. 4B are a flowchart of a data processing method according to this application.
Figure 4B:
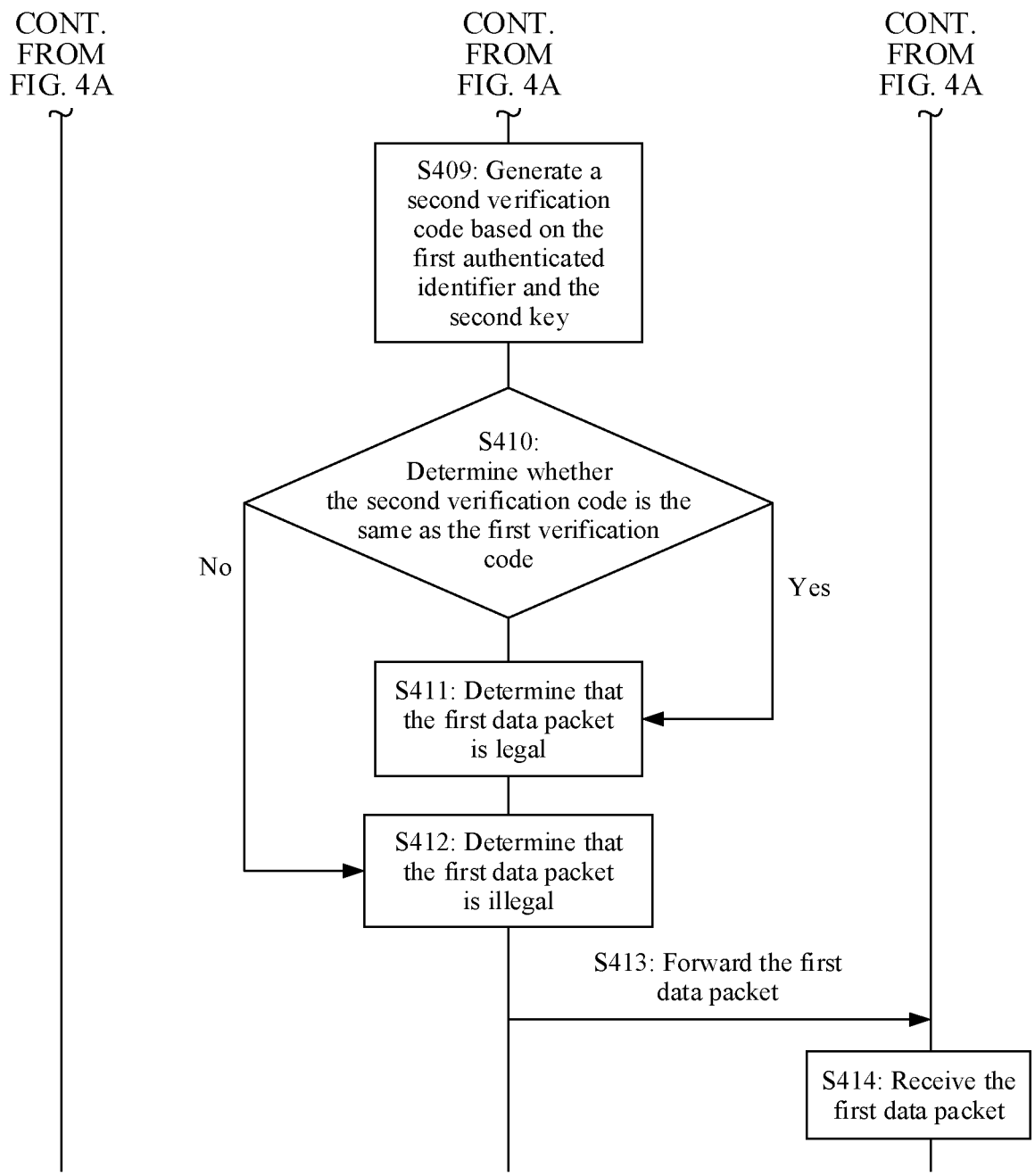

The following describes in detail a data processing method according to this application. FIG. 4A and FIG. 4B are a flowchart of the data processing method according to an embodiment of this application. An example in which a first terminal accesses a first service supported by an application server is used for description herein. As shown in FIG. 4A and FIG. 4B, the method may include the following steps.

S401: The application server obtains a first authenticated identifier and a first key.

In this embodiment, a key management center stores a service-key relationship of the first service, that is, a correspondence between a first service identifier and the first key. The first service identifier is used to indicate the first service running on the application server. The first key is a key corresponding to the first service, and the first key is used to derive a key of a registered terminal that can access the first service. The first key may refer to an MK. The application server may invoke a first unified SDK interface to send a request message to the key management center, to request the service-key correspondence of the first service. The application server receives the first service identifier and the first key fed back by the key management center.

The first service identifier may be used to generate the first authenticated identifier by the application server. The first authenticated identifier is used to identify the first terminal that accesses the first service. The first terminal may be a terminal that has registered with the application server and that can access the first service. Alternatively, the first authenticated identifier may be understood to be used to identify a terminal of a type that accesses the first service.

In some embodiments, after creating the first service, the application server may obtain the service-key correspondence of the first service from the key management center, and cache the first service identifier and the first key. After the first terminal completes registration, the application server invokes a second unified SDK interface based on the first service identifier and a first terminal identifier to generate the first authenticated identifier for the registered first terminal, or the application server invokes the second unified SDK interface based on the first terminal identifier to generate the first authenticated identifier for the registered first terminal.

In other embodiments, after the first terminal completes registration, the application server obtains the service-key correspondence of the first service from the key management center, and then invokes a second unified SDK interface based on the first service identifier and a first terminal identifier to generate the first authenticated identifier for the registered first terminal, or the application server invokes the second unified SDK interface based on the first terminal identifier to generate the first authenticated identifier for the registered first terminal.

Figure 5A:
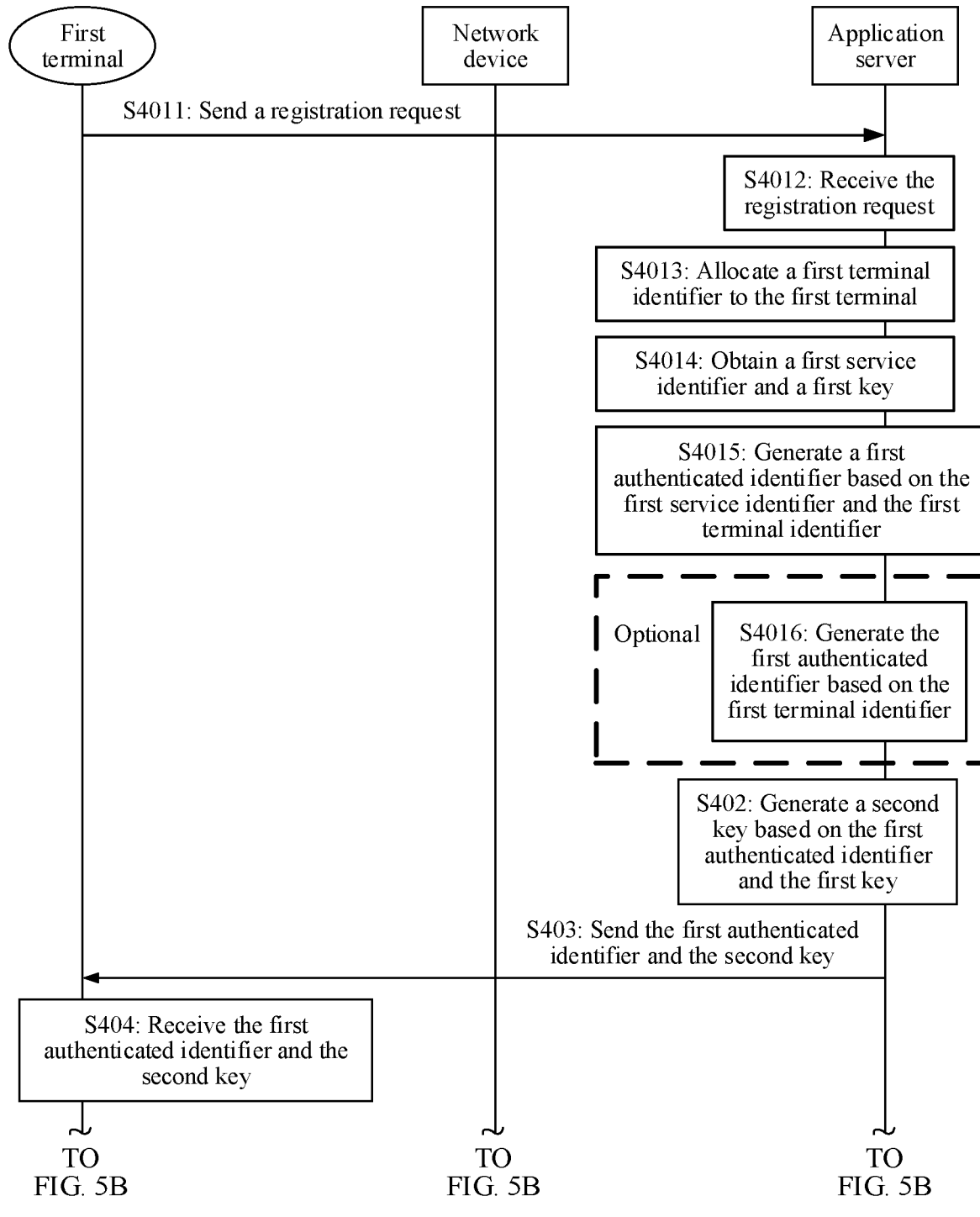
FIG. 5A, FIG. 5B, and FIG. 5C are a flowchart of another data processing method according to this application.

For example, as shown in FIG. 5A, an implementation in which the application server obtains the first authenticated identifier may be described in S4011 to S4015, or described in S4011 to S4014 and S4016.

S4011: The first terminal sends a registration request to the application server.

S4012: The application server receives the registration request sent by the first terminal.

In some embodiments, the registration request may include the first service identifier, and is used to request the application server to authorize the first terminal to access the first service.

S4013: The application server allocates the first terminal identifier (or client identifier (CID)) to the first terminal.

After receiving the registration request sent by the first terminal, the application server allocates the first terminal identifier to the first terminal. The first terminal identifier is used to indicate the first terminal.

S4014: The application server obtains the first service identifier and the first key.

The application server may invoke the first unified SDK interface to obtain the first service identifier and the first key from the key management center. For details, refer to the foregoing description. Details are not described again.

S4015: The application server generates the first authenticated identifier based on the first service identifier and the first terminal identifier.

In some embodiments, the application server may generate the first authenticated identifier based on the first service identifier and the first terminal identifier by using a hashing algorithm. The hashing algorithm may also be referred to as a hash function. The hashing algorithm may be a function of changing an input message string of any length into an output string of a fixed length.

S4016: The application server generates the first authenticated identifier based on the first terminal identifier.

In some embodiments, the application server may generate the first authenticated identifier based on the first terminal identifier by using the hashing algorithm.

It should be noted that an authenticated identifier is a unique identifier used to identify the first terminal that accesses the first service. Therefore, when generating the first authenticated identifier, the application server needs to refer to an authenticated identifier already allocated to another terminal, to avoid confusion caused by allocating a same authenticated identifier to different terminals.

It should be noted that a sequence of steps in the data processing method provided in this embodiment of this application may be appropriately adjusted, or the steps may be correspondingly added or deleted based on a situation. For example, a sequence of S4016 and S4014 may be exchanged. To be specific, the first authenticated identifier may be first generated based on the first terminal identifier, and then the first key is obtained. Any variation method readily figured out by a person skilled in the art within the technical scope disclosed in this application shall fall within the protection scope of this application. Therefore, details are not described herein.

The first key may be used to generate a second key by the application server. The second key is a key corresponding to the first terminal. The second key may refer to a CK.

In some embodiments, after creating the first service, the application server may obtain the service-key correspondence of the first service from the key management center, and cache the first service identifier and the first key. After the first terminal completes registration, the application server invokes an SDK interface based on the first key to generate the second key for the registered first terminal.

In other embodiments, after the first terminal completes registration, the application server obtains the service-key correspondence of the first service from the key management center, and then invokes the second unified SDK interface based on the first key to generate the second key for the registered first terminal.

S402: The application server generates the second key based on the first authenticated identifier and the first key.

In some embodiments, the application server may generate the second key based on the first authenticated identifier and the first key by using the hashing algorithm.

S403: The application server sends the first authenticated identifier and the second key to the first terminal.

In some embodiments, the application server may send the first authenticated identifier and the second key to the first terminal based on an application layer security protocol. This avoids leakage of the first authenticated identifier and the second key.

S404: The first terminal receives the first authenticated identifier and the second key.

In some embodiments, the first terminal receives the first authenticated identifier and the second key, and may cache the first authenticated identifier and the second key, so that the first terminal includes the first authenticated identifier and a first verification code in a first data packet when the first terminal needs to send the first data packet.

S405: The first terminal generates the first verification code based on the first authenticated identifier and the second key.

In some embodiments, the first terminal may generate the first verification code based on the first authenticated identifier, the second key, and at least one of a first locator, a second locator, and a dynamic parameter by using the hashing algorithm.

For example, the first terminal may generate the first verification code based on the first authenticated identifier, the second key, and the first locator by using the hashing algorithm.

For another example, the first terminal may generate the first verification code based on the first authenticated identifier, the second key, the first locator, and the dynamic parameter by using the hashing algorithm.

For another example, the first terminal may generate the first verification code based on the first authenticated identifier, the second key, the first locator, and the second locator by using the hashing algorithm.

For another example, the first terminal may generate the first verification code based on the first authenticated identifier, the second key, the first locator, the second locator, and the dynamic parameter by using the hashing algorithm.

A replay attack may be mitigated because the first verification code is bound to a source IP and a destination IP. Therefore, a zombie host cannot randomly forge the source IP.

The first locator is used to indicate the application server that supports running the first service. In some embodiments, the first locator may be a location identifier of the application server that supports running the first service. In other embodiments, the first locator may be a routing identifier of the application server that supports running the first service. For example, a locator allocation center may allocate a locator to each application server in the data center. The first terminal may access a Domain Name System (DNS) server, obtain a static identifier of the application server, and access, by using the static identifier of the application server, the first service run by the application server. The static identifier of the application server includes the first locator. In some embodiments, the static identifier of the application server may further include the first service identifier.

The second locator is used to indicate the first terminal. In some embodiments, the second locator may be a location identifier of the first terminal. In other embodiments, the second locator may be an IP address of the first terminal.

The dynamic parameter may vary with time. In some embodiments, the dynamic parameter may be time information.

S406: The first terminal sends the first data packet, where the first data packet includes the first authenticated identifier and the first verification code.

The first authenticated identifier and the first verification code may be set in a network layer protocol header or a transport layer protocol header included in the first data packet.

In a first implementation, the first authenticated identifier and the first verification code may be set in a destination IP address included in the first data packet. For example, the destination IP address may be a destination IP address in an IPv6 data packet.

Figure 6:
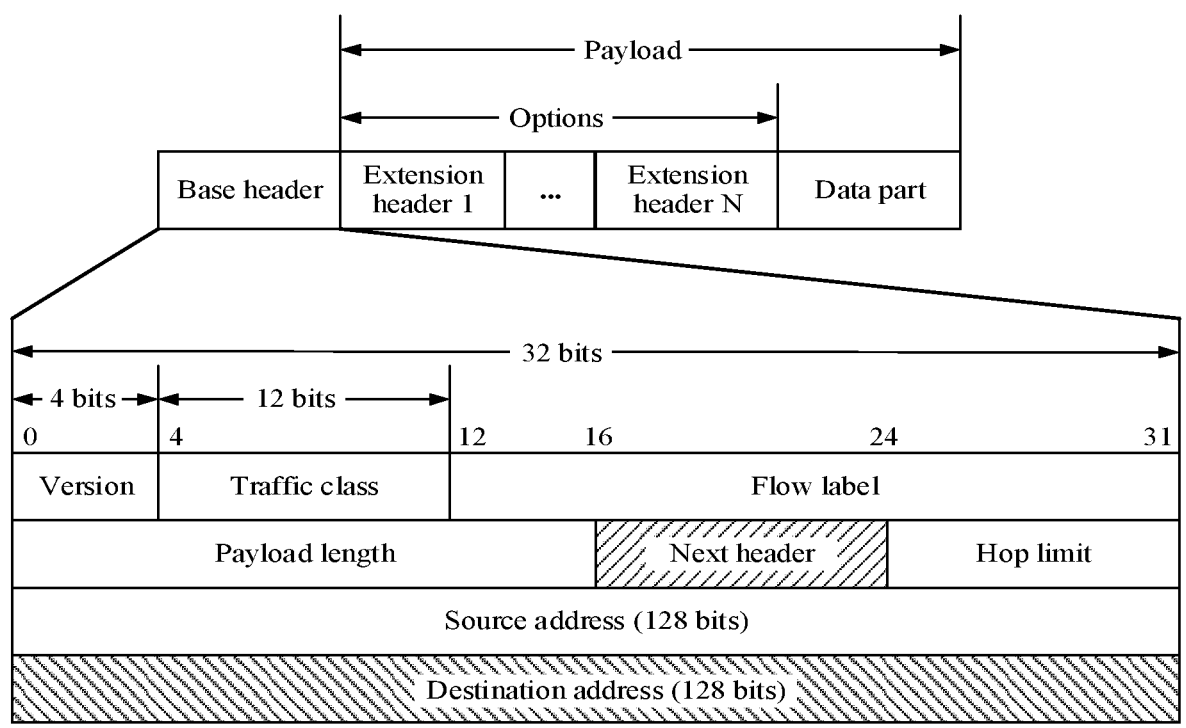
FIG. 6 is an example diagram of a structure of an IPv6 data packet according to this application.

For example, FIG. 6 is an example diagram of a structure of the IPv6 data packet. The IPv6 data packet includes a base header, N extension headers, and a data part. The N extension headers and the data part may be referred to as payloads. The base header includes a version, a traffic class, a flow label, a payload length, a next header, a hop limit, a source address, and a destination address. For specific explanations of fields in the IPv6 data packet, refer to descriptions in the conventional technology. Details are not described again.

The destination address is an IP address of a receive end of a data packet, occupying 128 bits. For example, the first authenticated identifier and the first verification code may be set in the destination IP address in the IPv6 data packet.

For another example, the destination IP address may be a destination IP address in an IPv4 data packet.

In this case, the first authenticated identifier may be embedded in an IP address of the application server, so that the network device may directly perform filtering at a network layer. This reduces costs of defending against a DDoS attack, does not rely on cross-domain collaboration, and does not rely on parsing of data in an upper layer (for example, an application layer) protocol.

In some embodiments, the first authenticated identifier and the first verification code may be set in a source IP address included in the first data packet. For example, the source IP address may be a source IP address in the IPv6 data packet. For another example, the source IP address may be a source IP address in the IPv4 data packet.

In a second implementation, the first authenticated identifier and the first verification code may be set in a next header in the network layer protocol header included in the first data packet. In this case, the first authenticated identifier may be embedded in a next header field, so that the network device may directly perform filtering at a network layer. This reduces costs of defending against a DDoS attack, does not rely on cross-domain collaboration, and does not rely on parsing of data in an upper layer (for example, an application layer) protocol.

In a third implementation, the first authenticated identifier and the first verification code may be set in an option field in the network layer protocol header included in the first data packet. In this case, the first authenticated identifier may be embedded in the option field, so that the network device may directly perform filtering at a network layer. This reduces costs of defending against a DDoS attack, does not rely on cross-domain collaboration, and does not rely on parsing of data in an upper layer (for example, an application layer) protocol.

Figure 7:
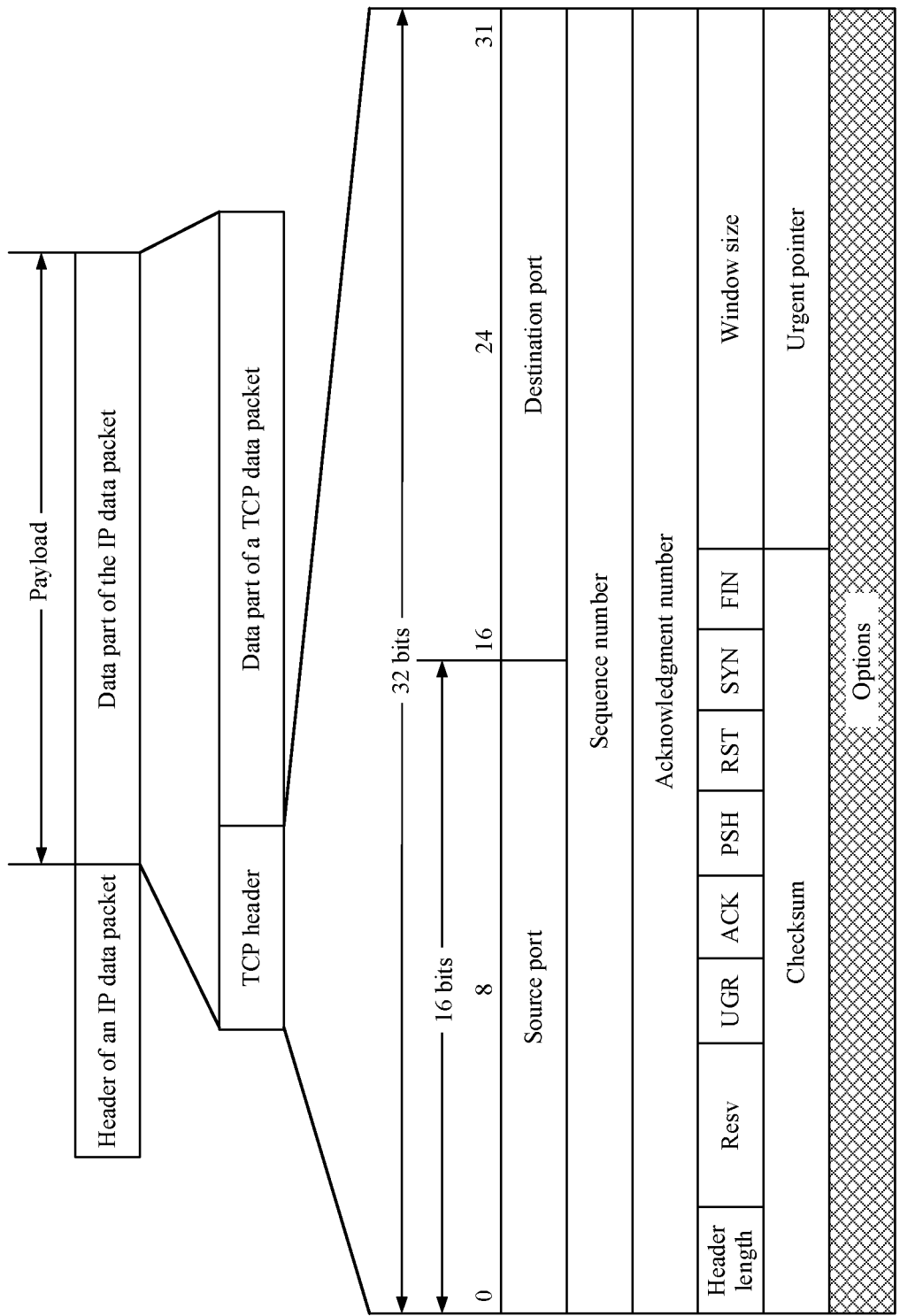
FIG. 7 is an example diagram of a structure of a TCP data packet according to this application.

In a fourth implementation, the first authenticated identifier and the first verification code may be set in an option field in a TCP header. For example, FIG. 7 is an example diagram of a structure of a TCP data packet. The TCP data packet is included within a data part of an IP data packet. The TCP data packet includes a TCP header and a data part of the TCP data packet. The TCP header includes a source port, a destination port, a sequence number, an acknowledgment number, a header length, resv, UGR, ACK, PSH, RST, SYN, FIN, window size, checksum, urgent pointer, and options. For specific explanations of fields in the TCP data packet, refer to descriptions in the conventional technology. Details are not described again.

In this case, the first authenticated identifier may be embedded in a next header field, so that the network device may directly perform filtering at a network layer. This reduces costs of defending against a DDoS attack, does not rely on cross-domain collaboration, and does not rely on parsing of data in an upper layer (for example, an application layer) protocol.

It should be noted that, when the first terminal detects that accessing the application server is congested, the data packet sent by the first terminal to the application server may include the first authenticated identifier and the first verification code. Alternatively, when the first terminal detects that accessing the application server is not congested, the data packet sent by the first terminal to the application server may include the first authenticated identifier and the first verification code.

In other embodiments, the first data packet may further include the first locator and the second locator. The first locator may be set in a destination IP address in an IPv6 data packet.

S407: The network device receives the first data packet.

S408: The network device obtains the second key corresponding to the first authenticated identifier.

After receiving the first data packet, the network device parses the first data packet to obtain the first authenticated identifier and the first verification code.

Figure 5B:
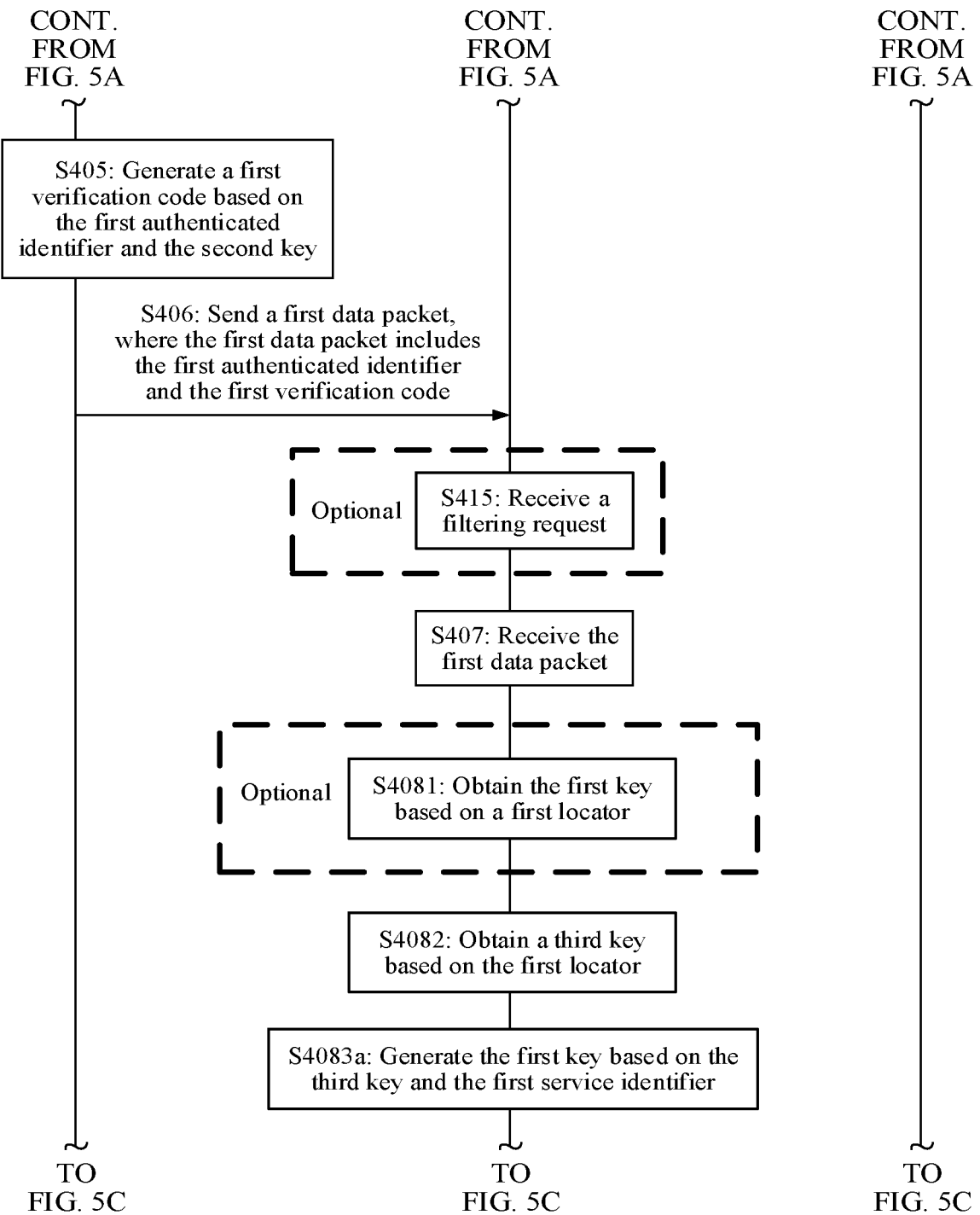
Figure 5C:
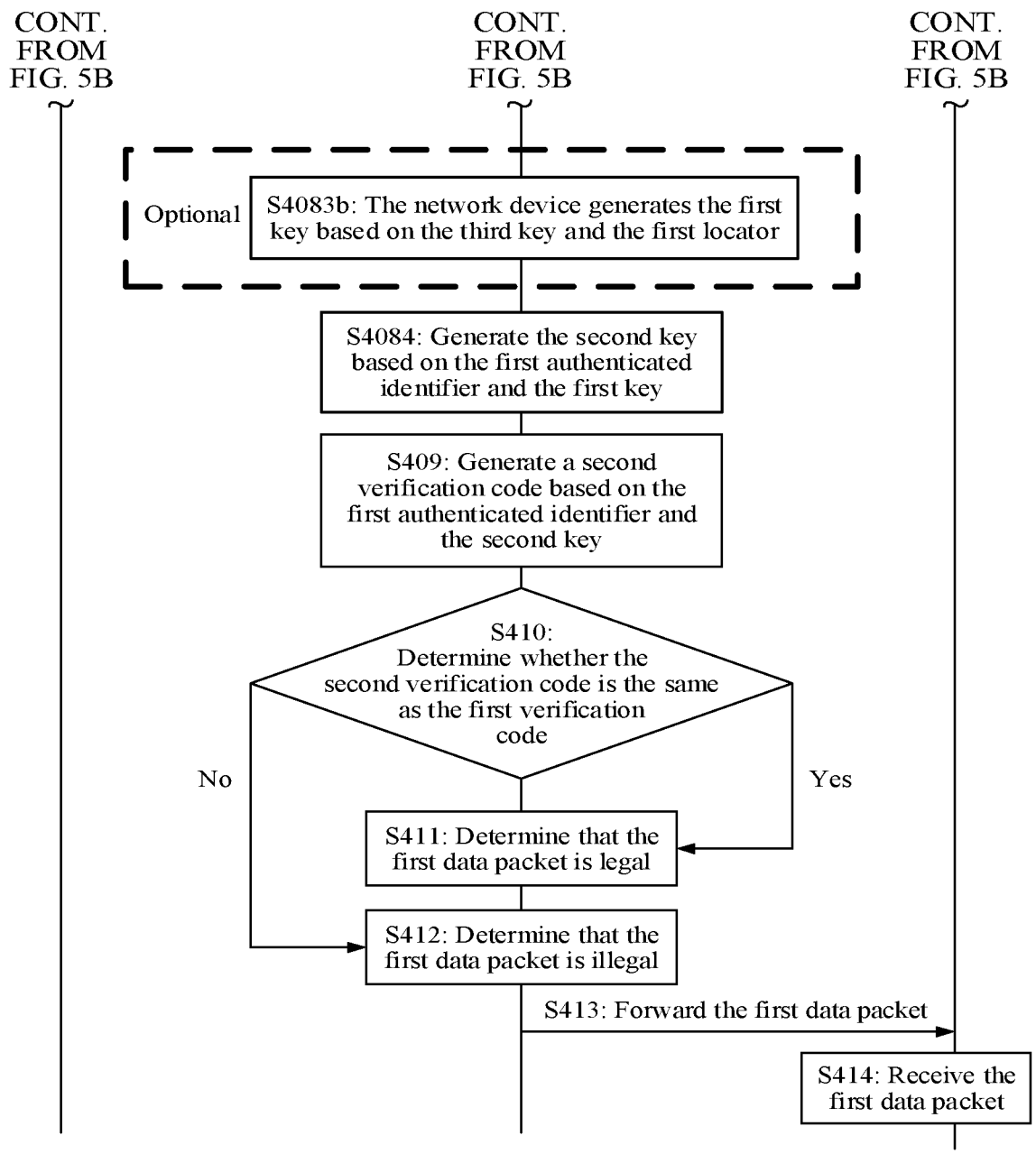

In a first implementation, as shown in FIG. 5B and FIG. 5C, the network device obtains the second key corresponding to the first authenticated identifier according to the following description of S4081 and S4084.

In a second implementation, as shown in FIG. 5B and FIG. 5C, the network device obtains the second key corresponding to the first authenticated identifier according to the following description of S4082 to S4084.

S4081: The network device obtains the first key based on the first locator.

In some embodiments, the first data packet includes the first locator. The first locator may be set in a destination address in an IPv6 data packet. After receiving the first data packet, the network device parses the first data packet to obtain the first locator. The first locator is used to indicate the application server that supports running the first service. In some embodiments, the first locator may be a location identifier of the application server that supports running the first service. In other embodiments, the first locator may be a routing identifier of the application server that supports running the first service.

The network device may obtain a locator and a key corresponding to a service from the data center in advance. The network device may maintain a locator-master key correspondence. The locator-master key correspondence may be a correspondence between a locator and a master key corresponding to a service. The locator-master key correspondence may be presented in a form of a table. The network device may store a locator-master key correspondence table, and the locator-master key correspondence table includes at least one locator-master key correspondence. For example, the locator-master key correspondence is presented as shown in Table 2.

TABLE 2

| Locator-master key correspondence | |
|---|---|
| Locator | Master key |
| locator 1 | MK 1 |
| locator 2 | MK 2 |
| locator 3 | MK 3 |

It should be noted that Table 2 merely shows, in a form of a table, a storage form of the locator-master key correspondence in the network device, but does not limit the storage form of the locator-master key correspondence in the network device. Certainly, the storage form of the locator-master key correspondence in the network device may alternatively be in another form. This is not limited in this embodiment of this application.

After obtaining the first locator, the network device may locally obtain and query a locator-master key correspondence, to obtain the first key corresponding to the first locator. The first key is a key corresponding to the first service, and the first key is used to derive a key of a registered terminal that can access the first service.

S4082: The network device obtains a third key based on the first locator.

In some embodiments, the network device may obtain a locator and a root key (RK) from the data center in advance. The root key is used to derive a key corresponding to a service. The network device may maintain a locator-root key correspondence. The locator-root key correspondence may be a correspondence between a locator and a root key. The locator-root key correspondence may be presented in a form of a table. The network device may store a locator-root key correspondence table, and the locator-root key correspondence table includes at least one locator-root key correspondence. For example, the locator-root key correspondence is presented as shown in Table 3.

TABLE 3

| Locator-root key correspondence | |
|---|---|
| Locator | Root key |
| locator 1 | RK |
| locator 2 | |
| locator 3 | |

It should be noted that Table 3 merely shows, in a form of a table, a storage form of the locator-root key correspondence in the network device, but does not limit the storage form of the locator-root key correspondence in the network device. Certainly, the storage form of the locator-root key correspondence in the network device may alternatively be in another form. This is not limited in this embodiment of this application.

After obtaining the first locator, the network device may locally obtain and query a locator-root key correspondence, to obtain the third key corresponding to the first locator. The third key is used to derive a key corresponding to a service. The third key may refer to a root key.

Because all services share a same root key, a mapping table that needs to be maintained by the network device is small, and there is no need to maintain a correspondence entry for each service. In addition, this reduces query overheads of the network device.

S4083a: The network device generates the first key based on the third key and the first service identifier.

In some embodiments, the network device may generate the first key based on the third key and the first service identifier by using the hashing algorithm. The first data packet may include the first service identifier. For example, the first service identifier may be set in a destination IP address field. For another example, the first service identifier may be set in a next header field in the network layer protocol. For another example, the first service identifier may be set in an option field in the TCP header. This is not limited in this application. After receiving the first data packet, the network device parses the first data packet to obtain the first service identifier. The first service identifier is used to indicate the first service running on the application server.

S4083b: The network device generates the first key based on the third key and the first locator.

In some embodiments, the network device may generate the first key based on the third key and the first locator by using the hashing algorithm. The first data packet may include the first locator. After receiving the first data packet, the network device parses the first data packet to obtain the first locator.

S4084: The network device generates the second key based on the first authenticated identifier and the first key.

In some embodiments, the network device may generate the second key based on the first authenticated identifier and the first key by using the hashing algorithm.

In a third implementation, the network device may obtain a locator and a key corresponding to a terminal from the data center in advance. The network device may maintain a locator-terminal key correspondence. The locator-terminal key correspondence may be a correspondence between a locator and a terminal key corresponding to a terminal. The locator-terminal key correspondence may be presented in a form of a table. The network device may store a locator-terminal key correspondence table, and the locator-terminal key correspondence table includes at least one locator-terminal key correspondence. For example, the locator-terminal key correspondence is presented as shown in Table 4.

TABLE 4

| Locator-terminal key correspondence | |
| --- | --- |
| Locator | Terminal key |
| locator 1 | CK 1 |
| locator 2 | CK 2 |
| locator 3 | CK 3 |

It should be noted that Table 4 merely shows, in a form of a table, a storage form of the locator-terminal key correspondence in the network device, but does not limit the storage form of the locator-terminal key correspondence in the network device. Certainly, the storage form of the locator-terminal key correspondence in the network device may alternatively be in another form. This is not limited in this embodiment of this application.

After obtaining the first locator, the network device may locally obtain and query a locator-terminal key correspondence, to obtain the second key corresponding to the first locator.

S409: The network device generates a second verification code based on the first authenticated identifier and the second key.

In some embodiments, the network device may generate the second verification code based on the first authenticated identifier, the second key, and at least one of the first locator, the second locator, and the dynamic parameter by using the hashing algorithm.

For example, the network device may generate the second verification code based on the first authenticated identifier, the second key, and the first locator by using the hashing algorithm.

For another example, the first terminal may generate the first verification code based on the first authenticated identifier, the second key, the first locator, and the dynamic parameter by using the hashing algorithm.

For another example, the network device may generate the second verification code based on the first authenticated identifier, the second key, the first locator, and the second locator by using the hashing algorithm.

For another example, the network device may generate the second verification code based on the first authenticated identifier, the second key, the first locator, the second locator, and the dynamic parameter by using the hashing algorithm.

The first data packet includes the first locator and the second locator. The first locator is used to indicate the application server that supports running the first service. The second locator is used to indicate the first terminal. In some embodiments, the second locator may be a location identifier of the first terminal. In other embodiments, the second locator may be an IP address of the first terminal. After receiving the first data packet, the network device parses the first data packet to obtain the first locator and the second locator.

The dynamic parameter varies with time. In some embodiments, the dynamic parameter may be time information. It should be noted that the dynamic parameter herein is the same as the dynamic parameter used when the first terminal generates the first verification code by using the hashing algorithm, to avoid verification failure caused by different dynamic parameters.

S410: The network device determines whether the second verification code is the same as the first verification code.

S411 is performed when the second verification code is the same as the first verification code. S412 is performed when the second verification code is different from the first verification code.

S411: The network device determines that the first data packet is legal, and performs S413.

S412: The network device determines that the first data packet is illegal.

In some embodiments, the network device determines that the first data packet is illegal, indicating that the network device may receive an illegal data packet (for example, a DDoS attack data packet). In this case, the network device discards the first data packet.

It should be noted that, because the first terminal is a legal terminal that has registered with the application server, the first terminal has the first authenticated identifier and the correct second key. Therefore, the network device may determine that the second verification code is the same as the first verification code. It is assumed that the first terminal is a terminal that does not register with the application server, and the first terminal has the first authenticated identifier, but does not have the second key. In this case, the first verification code generated by the first terminal based on an incorrect key is different from the second verification code. Therefore, the network device may determine that the first data packet is illegal.

S413: The network device forwards the first data packet to the application server.

S414: The application server receives the first data packet sent by the network device.

In some embodiments, the network device may verify, by default, a data packet that accesses the first service, to determine whether the data packet is a legal data packet. When the data packet is a legal data packet, the legal data packet is forwarded. When the data packet is an illegal data packet, the illegal data packet is discarded.

In other embodiments, the network device may verify, based on an indication, a data packet that accesses the first service, to determine whether the data packet is a legal data packet. For example, as shown in FIG. 5B, before the network device receives the first data packet, the method may further include the following step.

S415: The network device receives a filtering request.

In some embodiments, the filtering request is used to indicate to verify the data packet that accesses the first service, to defend against a DDoS attack. The filtering request may include the first locator, the first service identifier, and the first key.

In the data processing method provided in this embodiment of this application, an authenticated identifier and a key corresponding to the authenticated identifier are allocated to a terminal that accesses a service supported by an application server. The terminal includes the authenticated identifier and a verification code in a sent data packet, so that a network device can identify a legal data packet and an illegal data packet based on the authenticated identifier and the verification code. Only the legal data packet can be forwarded. Compared with a black hole technology, the data processing method provided in this embodiment of this application can ensure that legal traffic (which is traffic sent by a registered terminal) is forwarded, and the network device filters out most of DDoS attack traffic. Compared with a traffic cleaning technology, the data processing method provided in this embodiment of this application can reduce a delay of processing the legal traffic caused by deep protocol parsing. In addition, the authenticated identifier may be embedded in an IP address of the application server, so that the network device may directly perform filtering at a network layer. This reduces costs of defending against a DDoS attack, and does not rely on cross-domain collaboration.

In other embodiments, if the first terminal is a terminal that is not registered with the application server, the first authenticated identifier and the second key are leaked, and the first terminal has the first authenticated identifier and the correct second key, the first verification code generated by the first terminal based on the first authenticated identifier and the correct second key is the same as the second verification code. In this case, the application server may be under the DDoS attack. When the network device may determine that a volume of traffic corresponding to the first authenticated identifier is greater than or equal to a threshold, the network device may limit the traffic corresponding to the first authenticated identifier without verification of a verification code. Therefore, a large number of data packets are prevented from being sent to the application server to defend against the DDoS attack.

In the embodiments provided in this application, the method provided in the embodiments of this application is described separately from perspectives of the network device, the terminal, the application server, and interaction between the network device, the terminal, and the application server. It may be understood that, to implement the foregoing functions in the method provided in the embodiments of this application, the network elements, such as the network device, the terminal, and the application server, include a corresponding hardware structure and/or software module that is used to perform each function. A person skilled in the art should easily be aware that, in combination with algorithm steps of the examples described in the embodiments disclosed in this specification, this application can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device, the terminal, and the application server may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. It should be noted that division into the modules is an example and is merely logical function division in the embodiments of this application. During actual implementation, another division manner may be used.

Figure 8:
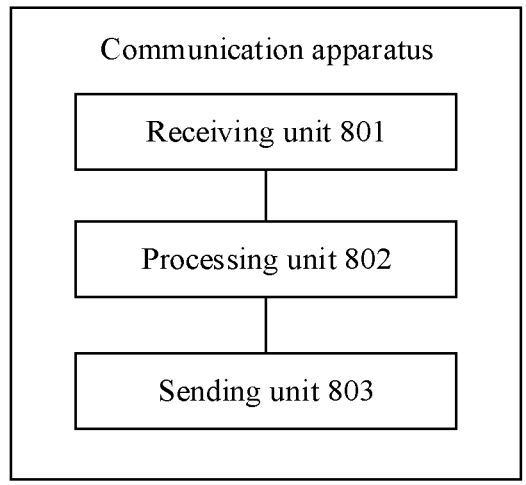
FIG. 8 is an example diagram of composition of a communication apparatus according to this application.

When each functional module is obtained through division based on each corresponding function, FIG. 8 is an example diagram of possible composition of the communication apparatus according to the embodiments. The communication apparatus can perform steps performed by the network device, the terminal, or the application server in any of the method embodiments of this application. As shown in FIG. 8, the communication apparatus may include a receiving unit 801, a processing unit 802, and a sending unit 803.

The communication apparatus is a terminal or a communication apparatus that supports the terminal in implementing the method provided in the embodiments. For example, the communication apparatus may be a chip system.

The receiving unit 801 is configured to support the communication apparatus in performing the method described in the embodiments of this application. For example, the receiving unit 801 is configured to perform or support the communication apparatus in performing S404 in the data processing method shown in FIG. 4A, or S404 in the data processing method shown in FIG. 5A.

The processing unit 802 is configured to perform or support the communication apparatus in performing S405 in the data processing method shown in FIG. 4A, or S405 in the data processing method shown in FIG. 5B.

The sending unit 803 is configured to perform or support the communication apparatus in performing S406 in the data processing method shown in FIG. 4A, or S406 in the data processing method shown in FIG. 5B.

The communication apparatus is a network device or a communication apparatus that supports the network device in implementing the method provided in the embodiments. For example, the communication apparatus may be a chip system.

The receiving unit 801 is configured to support the communication apparatus in performing the method described in the embodiments of this application. For example, the receiving unit 801 is configured to perform or support the communication apparatus in performing S407 in the data processing method shown in FIG. 4A, or S407 and S415 in the data processing method shown in FIG. 5B.

The processing unit 802 is configured to perform or support the communication apparatus in performing S408 to S412 in the data processing method shown in FIG. 4A, FIG. 4B, FIG. 5B, and FIG. 5C, or S4081, S4082, S4083*a*, S4083*b*, S4084, and S409 to S415 in the data processing method shown in FIG. 5B and FIG. 5C.

The sending unit 803 is configured to perform or support the communication apparatus in performing S413 in the data processing method shown in FIG. 4B, or S413 in the data processing method shown in FIG. 5C.

The communication apparatus is an application server or a communication apparatus that supports the application server in implementing the method provided in the embodiments. For example, the communication apparatus may be a chip system.

The receiving unit 801 is configured to support the communication apparatus in performing the method described in the embodiments of this application. For example, the receiving unit 801 is configured to perform or support the communication apparatus in performing S401 and S414 in the data processing method shown in FIG. 4A and FIG. 4B, or S4012, S4014, and S414 in the data processing method shown in FIG. 5A and FIG. 5C.

The processing unit 802 is configured to perform or support the communication apparatus in performing S402 in the data processing method shown in FIG. 4A, or S4013, S4015, S4016, and S402 in the data processing method shown in FIG. 5A.

The sending unit 803 is configured to perform or support the communication apparatus in performing S403 in the data processing method shown in FIG. 4A, or S403 in the data processing method shown in FIG. 5A.

It should be noted that all related content of the steps in the foregoing method embodiments may be cited in function descriptions of corresponding functional modules. Details are not described herein again.

The communication apparatus provided in this embodiment of this application is configured to perform the method in any one of the foregoing embodiments, and therefore can achieve same effects as the method in the foregoing embodiments.

Figure 9:
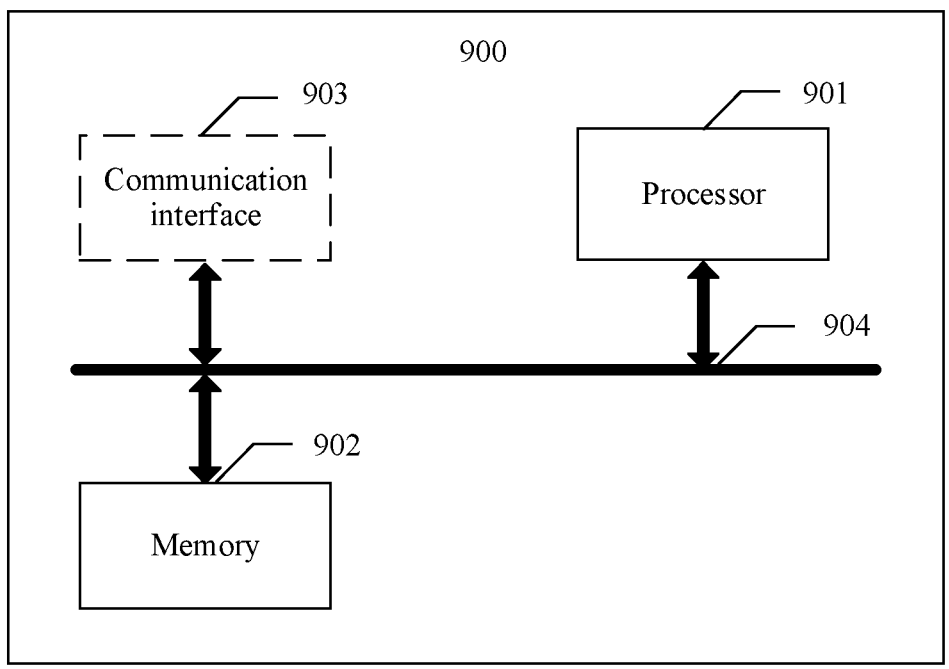
FIG. 9 is an example diagram of composition of another communication apparatus according to this application.

FIG. 9 shows a communication apparatus 900 according to an embodiment of this application, configured to implement functions of the network device in the foregoing method. The communication apparatus 900 may be a network device, or may be an apparatus in the network device. The communication apparatus 900 may be a chip system. In this embodiment of this application, the chip system may include a chip, or may include a chip and another discrete component. Alternatively, the communication apparatus 900 is configured to implement functions of the terminal in the foregoing method. The communication apparatus 900 may be a terminal, or may be an apparatus in the terminal. The communication apparatus 900 may be a chip system. In this embodiment of this application, the chip system may include a chip, or may include a chip and another discrete component. Alternatively, the communication apparatus 900 is configured to implement functions of the application server in the foregoing method. The communication apparatus 900 may be an application server, or may be an apparatus in the application server. The communication apparatus 900 may be a chip system. In this embodiment of this application, the chip system may include a chip, or may include a chip and another discrete component.

The communication apparatus 900 includes at least one processor 901, configured to implement functions of the network device, the terminal, or the application server in the method provided in the embodiments of this application. For example, the processor 901 may be configured to generate a first verification code based on a first authenticated identifier and a first key, generate the first key based on the first authenticated identifier and a second key, or the like. For details, refer to detailed descriptions in the method example. Details are not described herein again.

The communication apparatus 900 may further include at least one memory 902, configured to store program instructions and/or data. The memory 902 is coupled to the processor 901. The coupling in this embodiment of this application is indirect coupling or a communication connection between apparatuses, units, or modules, may be in an electrical, a mechanical, or another form, and is used for information exchange between the apparatuses, the units, or the modules. The processor 901 may cooperate with the memory 902. The processor 901 may execute the program instructions stored in the memory 902. At least one of the at least one memory may be included in the processor.

The communication apparatus 900 may further include a communication interface 903, configured to communicate with another device through a transmission medium, so that an apparatus in the communication apparatus 900 can communicate with the other device. For example, if the communication apparatus is a network device, the other device is a terminal. If the communication apparatus is a terminal, the other device is a network device. If the communication apparatus is a terminal, the other device is an application server. The processor 901 sends and receives data through the communication interface 903, and is configured to implement the methods performed by the network device, the terminal, or the application server in the embodiments corresponding to FIG. 4A, FIG. 4B, FIG. 5A, FIG. 5B, and FIG. 5C.

In this embodiment of this application, a specific connection medium between the communication interface 903, the processor 901, and the memory 902 is not limited. In this embodiment of this application, in FIG. 9, the communication interface 903, the processor 901, and the memory 902 are connected through a bus 904. The bus is represented by using a bold line in FIG. 9. A connection manner between other components is merely an example for description, and constitutes no limitation. The bus may be classified into an address bus, a data bus, a control bus, and the like. For ease of indication, the bus is indicated by using only one bold line in FIG. 9. However, it does not indicate that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the method disclosed with reference to the embodiments of this application may be directly presented as being performed and completed by a hardware processor, or performed and completed by a combination of hardware and a software module in the processor.

In the embodiments of this application, the memory may be a nonvolatile memory, such as a hard disk drive (HDD) or a solid-state drive (SSD), or may be a volatile memory, such as a random-access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

Optionally, the first authenticated identifier may alternatively be a type identifier (ID) of the first terminal, and is used to identify a type of the first terminal. Alternatively, the first authenticated identifier may be a group ID of the first terminal, and is used to identify a group in which the first terminal is located. After receiving the registration request sent by the first terminal, the application server may allocate the type identifier of the first terminal or the group identifier of the first terminal to the first terminal. For example, the group identifier of the first terminal is an identifier for distinguishing different departments in an enterprise. For another example, the group identifier of the first terminal is an identifier for distinguishing different levels of the accessed application server. The application server may provide financial (such as banking and UnionPay) services and video game services.

Figure 10:
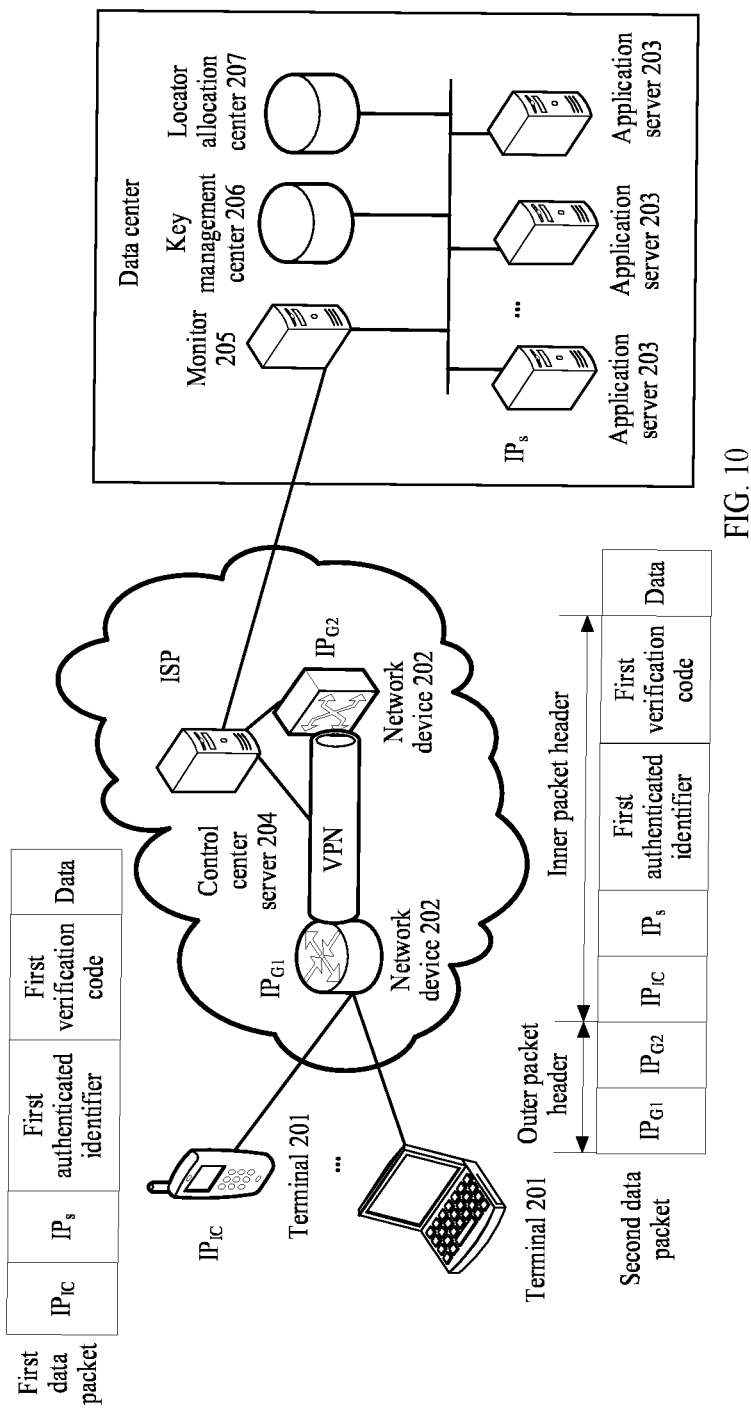
FIG. 10 is a schematic diagram of a communication scenario according to this application.

In some embodiments, as shown in FIG. 10, a user (for example, an enterprise employee) may access an application server through a virtual private network (VPN) between a first network device (for example, a network device 202 close to a terminal 201) and a second network device (for example, a network device 202 close to an application server 203). For explanations of the terminal 201, a data center, and an ISP in FIG. 10, refer to the foregoing explanation in FIG. 2. Details are not described again. The user and the application server may be located in a same area or in different areas.

A first data packet sent by a first terminal (for example, the terminal 201) includes a source address, a destination address, a first authenticated identifier, a first verification code, and data. The source address is an address $IP_{IC}$ of the first terminal. The destination address is an address $IP_s$ of the application server. A difference from the foregoing embodiments lies in that the first authenticated identifier is a group identifier of the first terminal or a type identifier of the first terminal. The first authenticated identifier used when the first terminal generates the first verification code by using a hashing algorithm is the group identifier of the first terminal or the type identifier of the first terminal. For a specific method for generating the first verification code, refer to the foregoing embodiment. Details are not described again.

In addition, after receiving the first data packet, the first network device verifies the first verification code included in the first data packet. If verification of the first verification code succeeds, the first data packet is encapsulated to obtain a second data packet. The second data packet includes an outer packet header and an inner packet header. A source address included in the outer packet header is an address $IP_{G1}$ of the first network device, and a destination address included in the outer packet header is an address $IP_{G2}$ of the second network device. A source address included in the inner packet header is the address $IP_{IC}$ of the first terminal, and a destination address included in the inner packet header is the address $IP_s$ of the application server. If verification of the first verification code fails, the first data packet is discarded. For a specific method for verifying the first verification code, refer to the foregoing embodiment. Details are not described again.

After receiving the first data packet whose verification succeeds, the second network device may determine, based on the group identifier and an access permission of the first terminal, to forward or discard the first data packet. In this way, traffic that does not meet the permission is further filtered out.

Generally, an attacker may bypass a device for checking illegal access by connecting to an enterprise network inside the enterprise, and attack the application server. This embodiment may be applied to an enterprise network or a campus network. On a VPN gateway side close to a terminal side, a data packet including a group identifier and a fake type identifier of a fake terminal is filtered out. This prevents an internal intruder from connecting to a VPN gateway on an access side, and prevents an illegal data packet from reaching the application server through a VPN tunnel. This ensures that each data packet reaching the application server uses a type identifier of a real terminal or a group identifier of the terminal, and that the illegal data packet is filtered out.

Figure 11:
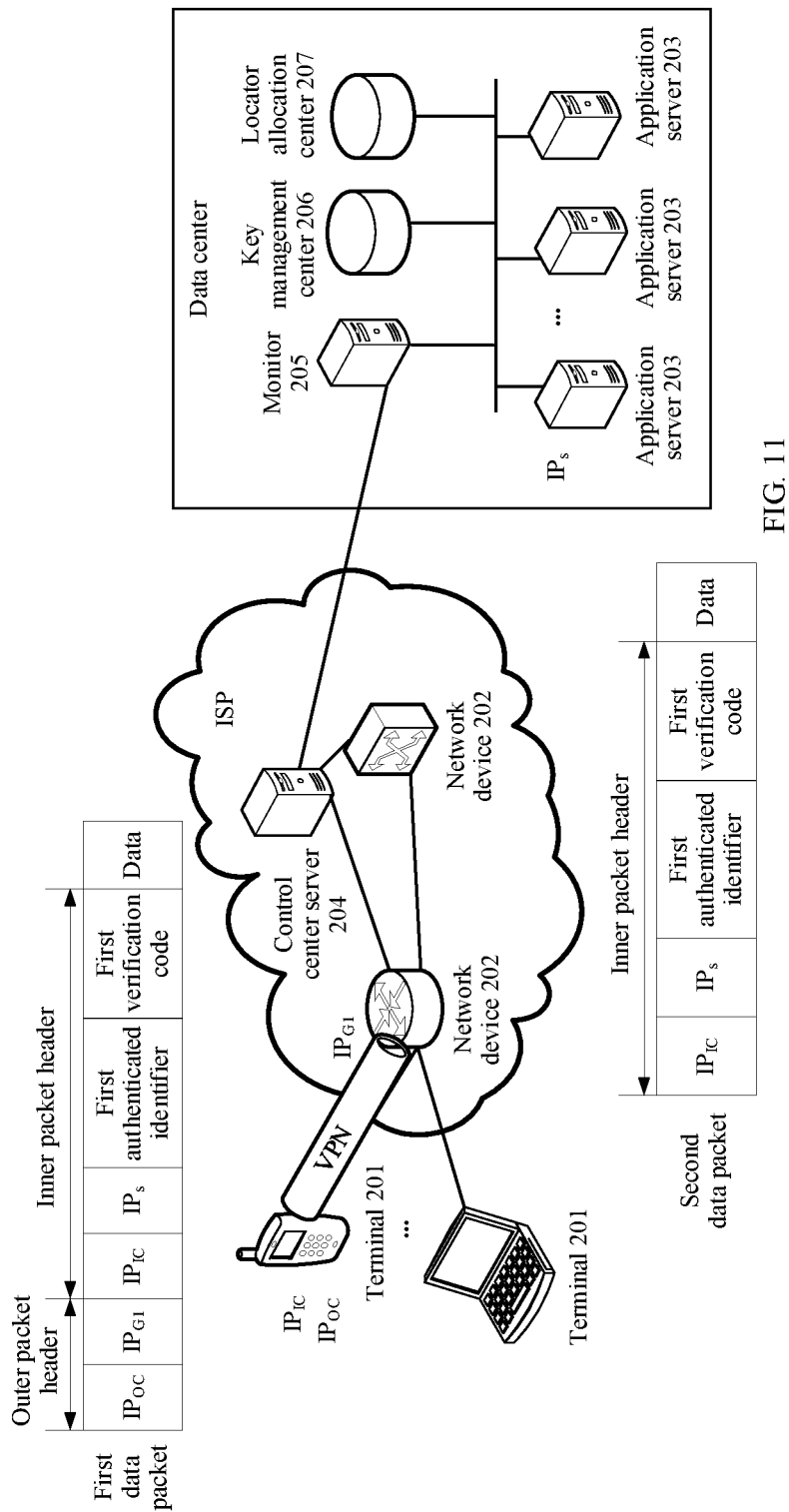
FIG. 11 is a schematic diagram of a communication scenario according to this application.

In some embodiments, as shown in FIG. 11, a user (for example, an enterprise employee) may access an application server through a VPN between a first terminal (for example, a terminal 201) and a network device (for example, a network device 202 close to the terminal 201). For explanations of the terminal 201, a data center, and an ISP in FIG. 11, refer to the foregoing explanation in FIG. 2. Details are not described again.

A difference from the foregoing embodiments lies in that a first data packet sent by the first terminal includes an outer packet header and an inner packet header. A source address included in the outer packet header is an address $IP_{OC}$ of the first terminal, and a destination address included in the outer packet header is an address $IP_{G1}$ of a first network device. The outer packet header further includes a first authenticated identifier and a first verification code. A source address included in the inner packet header is an address $IP_{IC}$ of the first terminal, and a destination address included in the inner packet header is an address $IP_s$ of the application server.

After receiving the first data packet, the network device verifies the first verification code. If verification of the first verification code succeeds, the outer packet header of the first data packet is removed to obtain a second data packet. The second data packet is forwarded. If verification of the first verification code fails, the first data packet is discarded. For a specific method for verifying the first verification code, refer to the foregoing embodiment. Details are not described again.

The foregoing descriptions of the implementations allow a person skilled in the art to clearly understand that, for the purpose of convenient and brief description, division into only the foregoing functional modules is used as an example for description. During actual application, the foregoing functions can be allocated to different functional modules for implementation as required. In other words, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division during actual implementation. For example, a plurality of units or components may be combined or integrated into another apparatus, or some features may be ignored or not performed. In addition, the displayed or discussed mutual coupling or direct coupling or communication connections may be implemented through some interfaces. The indirect coupling or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected depending on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

All or some of the methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, all or some of the procedures or functions according to the embodiments of the present disclosure are generated. The computer may be a general-purpose computer, a dedicated computer, a computer network, a network device, a terminal, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:
   generating a first key based on a first authenticated identifier and a second key, wherein the second key corresponds to a first service, and wherein the second key is for deriving a third key of a registered terminal that can access the first service;
   generating a first verification code based on the first authenticated identifier and the first key;
   setting the first authenticated identifier and the first verification code in a network layer protocol header of a first data packet or a transport layer protocol header of the first data packet; and
   sending the first data packet comprising the first authenticated identifier and the first verification code.

2. The method of claim 1, further comprising further generating the first verification code based on at least one of a first locator indicating a target device, a second locator indicating a first terminal, or a dynamic parameter that varies with time.

3. The method of claim 2, further comprising obtaining a static identifier of the target device, wherein the static identifier comprises the first locator.

4. The method of claim 1, further comprising further setting the first authenticated identifier and the first verification code in a next header field in the network layer protocol header or an Internet Protocol (IP) address field in the network layer protocol header.

5. The method of claim 1, further comprising further setting the first authenticated identifier and the first verification code in an option field in a Transmission Control Protocol (TCP) header of the first data packet.

6. The method of claim 1, wherein a service name of the first service, a service identifier associated with the first service, and the second key are stored in a table.

7. The method of claim 1, wherein the third key is a root key, and wherein multiple services share the root key.

8. A method, comprising:
   receiving a first data packet comprising a first authenticated identifier and a first verification code, wherein either a network layer protocol header of the first data packet or a transport layer protocol header of the first data packet comprises the first authenticated identifier and the first verification code;
   generating a first key based on the first authenticated identifier and a second key, wherein the second key corresponds to a first service, and wherein the second key is for deriving a third key of a registered terminal that can access the first service;
   generating a second verification code based on the first authenticated identifier and the first key;
   comparing the first verification code and the second verification code;
   forwarding the first data packet to a target device when the first verification code is the same as the second verification code; and
   discarding the first data packet when the first verification code is not the same as the second verification code.

9. The method of claim 8, further comprising obtaining the second key based on a first locator in the first data packet, wherein the first locator indicates the target device.

10. The method of claim 8, further comprising:
    obtaining a fourth key based on a first locator in the first data packet, wherein the fourth key is for deriving a fifth key corresponding to a service, and wherein the first locator indicates the target device; and
    either:
       generating the second key based on the fourth key and a first service identifier in the first data packet, wherein the first service identifier indicates the first service running on the target device; or generating the second key based on the fourth key and the first locator.

11. The method of claim 8, further comprising further generating the second verification code based on at least one of a first locator, a second locator, or a dynamic parameter, wherein the first data packet further comprises the first locator and the second locator, wherein the first locator indicates the target device, wherein the second locator indicates a first terminal, and wherein the dynamic parameter varies with time.

12. The method of claim 8, wherein before receiving the first data packet, the method further comprises receiving a filtering request comprising a first locator, a first service identifier, and the second key.

13. The method of claim 8, further comprising limiting, in response to a volume of traffic corresponding to the first authenticated identifier being greater than or equal to a threshold, the traffic.

14. The method of claim 8, wherein the third key is a root key, and wherein multiple services share the root key.

15. An apparatus, comprising:
a receiver configured to receive a first authenticated identifier and a first key, wherein the first key is based on the first authenticated identifier and a second key, wherein the second key corresponds to a first service, and wherein the second key is for deriving a third key of a registered terminal that can access the first service;
one or more processors coupled to the receiver and configured to:
generate a first verification code based on the first authenticated identifier and the first key; and
set the first authenticated identifier and the first verification code in a network layer protocol header of a first data packet or a transport layer protocol header of the first data packet; and
a transmitter coupled to the one or more processors and configured to send the first data packet comprising the first authenticated identifier and the first verification code.

16. The apparatus of claim 15, wherein the one or more processors are further configured to further generate the first verification code based on at least one of a first locator indicating a target device, a second locator indicating a first terminal, and a dynamic parameter that varies with time.

17. The apparatus of claim 16, wherein the one or more processors are further configured to obtain a static identifier of the target device, and wherein the static identifier comprises the first locator.

18. The apparatus of claim 15, wherein the one or more processors are further configured to further set the first authenticated identifier and the first verification code in a next header field in the network layer protocol header or an Internet Protocol (IP) address field in the network layer protocol header.

19. The apparatus of claim 15, wherein the one or more processors are further configured to further set the first authenticated identifier and the first verification code in an option field in a Transmission Control Protocol (TCP) header of the first data packet.

20. The apparatus of claim 15, wherein a service name of the first service, a service identifier associated with the first service, and the second key are stored in a table.

* * * * *